US009534618B1

(12) United States Patent
Allen et al.

(10) Patent No.: US 9,534,618 B1
(45) Date of Patent: *Jan. 3, 2017

(54) FAIRING BODIES WITH MULTIPLE PARTS

(71) Applicant: VIV Solutions LLC, Richmond, TX (US)

(72) Inventors: Donald Wayne Allen, Richmond, TX (US); Julie Ann Dehne, Cypress, TX (US); William Andrew West, Friendswood, TX (US)

(73) Assignee: VIV Solutions LLC, Richmond, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/845,103

(22) Filed: Sep. 3, 2015

Related U.S. Application Data

(60) Provisional application No. 62/046,160, filed on Sep. 4, 2014, provisional application No. 62/108,991, filed on Jan. 28, 2015, provisional application No. 62/160,604, filed on May 13, 2015.

(51) Int. Cl.
*E02D 5/60* (2006.01)
*F15D 1/10* (2006.01)
*E21B 17/01* (2006.01)

(52) U.S. Cl.
CPC . *F15D 1/10* (2013.01); *E02D 5/60* (2013.01); *E21B 17/01* (2013.01)

(58) Field of Classification Search
CPC ..... B63B 2021/504; B63B 21/663; E02D 5/34
See application file for complete search history.

(56) References Cited

U.S. PATENT DOCUMENTS

| 1,104,254 | A | * | 7/1914 | Eddelbuttel-Reimers | B63B 21/663 114/243 |
| 3,194,204 | A | * | 7/1965 | Nichols | B63B 21/663 114/243 |
| 3,899,991 | A | * | 8/1975 | Chatten | B63B 21/663 114/243 |
| 4,200,999 | A | * | 5/1980 | Latimer | B63B 21/663 114/243 |
| 6,067,922 | A | * | 5/2000 | Denison | B63B 21/663 114/243 |
| 6,223,672 | B1 | * | 5/2001 | Allen | B63B 21/502 114/243 |
| 9,080,610 | B1 | * | 7/2015 | West | E02D 5/60 |
| 2005/0254903 | A1 | * | 11/2005 | McMillan | F16L 1/20 405/216 |
| 2006/0021560 | A1 | * | 2/2006 | McMillan | E21B 17/01 114/221 R |
| 2007/0104542 | A1 | * | 5/2007 | Somerville | B63B 21/663 405/224.1 |
| 2013/0039702 | A1 | * | 2/2013 | West | F15D 1/10 405/216 |

* cited by examiner

*Primary Examiner* — Benjamin Fiorello
(74) *Attorney, Agent, or Firm* — Blakely Sokoloff Taylor & Zafman LLP

(57) ABSTRACT

A fairing for suppressing a vortex induced vibration (VIV) of a tubular. The fairing including a tail member dimensioned to suppress a vortex induced vibration of a tubular. The fairing further including an encircling member dimensioned to encircle less than an entire circumference of a tubular, the encircling member being separable from the tail member. The fairing further including a connecting assembly dimensioned to attach the tail member to the encircling member.

19 Claims, 24 Drawing Sheets

FAIRING BODIES WITH MULTIPLE PARTS

CROSS-REFERENCE TO RELATED APPLICATION

This non-provisional application claims the benefit of the earlier filing dates U.S. Provisional Patent Application No. 62/046,160, filed Sep. 4, 2014, U.S. Provisional Patent Application No. 62/108,991, filed Jan. 28, 2015 and U.S. Provisional Patent Application No. 62/160,604, filed May 13, 2015, the disclosures of which are incorporated herein by reference.

FIELD

A fairing having multiple parts, more specifically, a fairing have a fairing tail, a fairing nose and a connecting assembly for attaching the fairing tail to the fairing nose. Other embodiments are also described herein.

BACKGROUND

A difficult obstacle associated with the exploration and production of oil and gas is management of significant ocean currents. These currents can produce vortex-induced vibration (VIV) and/or large deflections of tubulars associated with drilling and production. VIV can cause substantial fatigue damage to the tubular or cause suspension of drilling due to increased deflections. Both helical strakes and fairings can provide sufficient VIV suppression.

Fairings are typically free to weathervane (rotate) about the longitudinal axis of the tubular, and are supported by collars to keep them from sliding along the tubular axis more than desired. Often, collars are used at each end of the fairing to maintain the desired axial position.

A problem associated with fairings is that, when used on drilling risers or other risers for which installation costs are quite high, the time to install them can be expensive.

Another problem associated with fairings is that the cost of fasteners can be quite substantial, especially when metallic fasteners (that must survive long periods of time in seawater) are required.

Another problem, for tubulars with one or more adjacent lines near their surface, is that the fairing body must completely encircle the tubular in order to achieve maximum VIV suppression effectiveness.

Another problem with fairings is that they must have sufficient friction against their rotation to insure that they work most effectively.

Another problem with fairings is that they can take up very large amounts of storage space prior to installation (or after installation if they are retrieved such as for a drilling riser).

SUMMARY

The present invention consists of a fairing that is comprised of two or more parts, for example, a fairing tail and an encircling member such as a fairing nose or strap that encircles a tubular and can be used to attach the tail to the tubular. In addition, the fairing may include a fairing tail that is fast to install and fabricate, as well as less expensive to fabricate. In some embodiments, the fairings (consisting of the two or more parts) completely encircle the tubular, especially when more than one tubular is present. The fairings may have sufficient friction against rotation. In addition, the fairings may take up minimal storage space.

More specifically, the invention is directed to a fairing for suppressing a vortex induced vibration (VIV) of a tubular. The fairing may include a tail member dimensioned to suppress a vortex induced vibration of a tubular and an encircling member dimensioned to encircle less than an entire circumference of a tubular. The encircling member may be separable from the tail member. In addition, the fairing may include a connecting assembly dimensioned to attach the tail member to the encircling member. In some cases, the tail member may include a base portion and a fin portion. The base portion may be dimensioned to encircle a tubular and the fin portion may extend from the base portion in a direction normal to the tubular. In some embodiments, the tail member encircles less than an entire circumference of a tubular when positioned on the tubular. In some cases, the encircling member has a height that is equal to, or less than, a height of the tail member. The encircling member may include a first end and a second end that are connected to the tail member by the connecting assembly. The connecting assembly may include a first bolt and a second bolt. The first bolt is inserted through the first end and the tail member and the second bolt is inserted through the second end and the tail member. In other cases, the connecting assembly includes an insertion member attached to the encircling member and a channel formed within the tail member. The insertion member is dimensioned to be inserted into the channel. The channel may be formed through a side of the tail member facing away from a tubular around which the tail member is positioned. The insertion member may extend from an inner surface of the encircling member in a direction substantially perpendicular to the inner surface and the channel is formed within an outer surface of the tail member. The tail member may include a first set of tabs and the encircling member includes a second set of tabs. Each of the first set of tabs includes an insertion member that is dimensioned for insertion within a channel formed within each of the second set of tabs. In other embodiments, the tail member includes a first set of tabs and the encircling member includes a second set of tabs. In this embodiment, each of the first set of tabs includes a hole and each of the second set of tabs includes a slot that can be aligned with the hole and a fastener inserted therein. In still further embodiments, the connecting assembly includes an insertion member extending from a surface of the tail member facing away from the tubular, an opening formed through an end of the encircling member and a lynch pin. In this embodiment, the insertion member is dimensioned for insertion through the opening and has an opening dimensioned to receive the lynch pin once the insertion member is inserted through the opening. In one embodiment, the tail member includes a stabilizing member formed on an outer surface of the tail member facing the encircling member. The stabilizing member is positioned on the outer surface such that it is above or below the encircling member when the insertion member is inserted through the opening in the encircling member. In still further embodiments, the connecting assembly includes a strap that attaches the encircling member to the tail member.

In still further embodiments, the invention is directed to a fairing having a tail member having a base portion that encircles less than an entire circumference of a tubular and a fin portion that extends from the base portion. The fairing further includes an encircling member dimensioned to encircle less than an entire circumference of a tubular, and the encircling member has a first end and a second end. In one embodiment, a slot is formed within the base portion and an insertion member extends from at least one of the first end or the second end. The insertion member is dimensioned to be inserted within the slot formed within the base portion to connect the encircling member to the tail member.

In still further embodiments, the fairing includes a tail member and an encircling member. The tail member has a base portion that encircles less than an entire circumference of a tubular and a fin portion that extends from the base portion. In addition, an insertion member extends from the base portion. The encircling member is dimensioned to encircle less than an entire circumference of a tubular and includes an insertion member opening dimensioned to receive the insertion member within one of its ends. In one embodiment, the insertion member further includes a pin opening that is dimensioned to receive a pin that is dimensioned to prevent the insertion member from sliding out of the insertion member opening. The pin may, for example, be a lynch pin.

The above summary does not include an exhaustive list of all aspects of the present invention. It is contemplated that the invention includes all apparatuses that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments disclosed herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section we shall explain several preferred embodiments with reference to the appended drawings. Whenever the shapes, relative positions and other aspects of the parts described in the embodiments are not clearly defined, the scope of the embodiments is not limited only to the parts shown, which are meant merely for the purpose of illustration. Also, while numerous details are set forth, it is understood that some embodiments may be practiced without these details. In other instances, well-known structures and techniques have not been shown in detail so as not to obscure the understanding of this description.

Figure 1A:
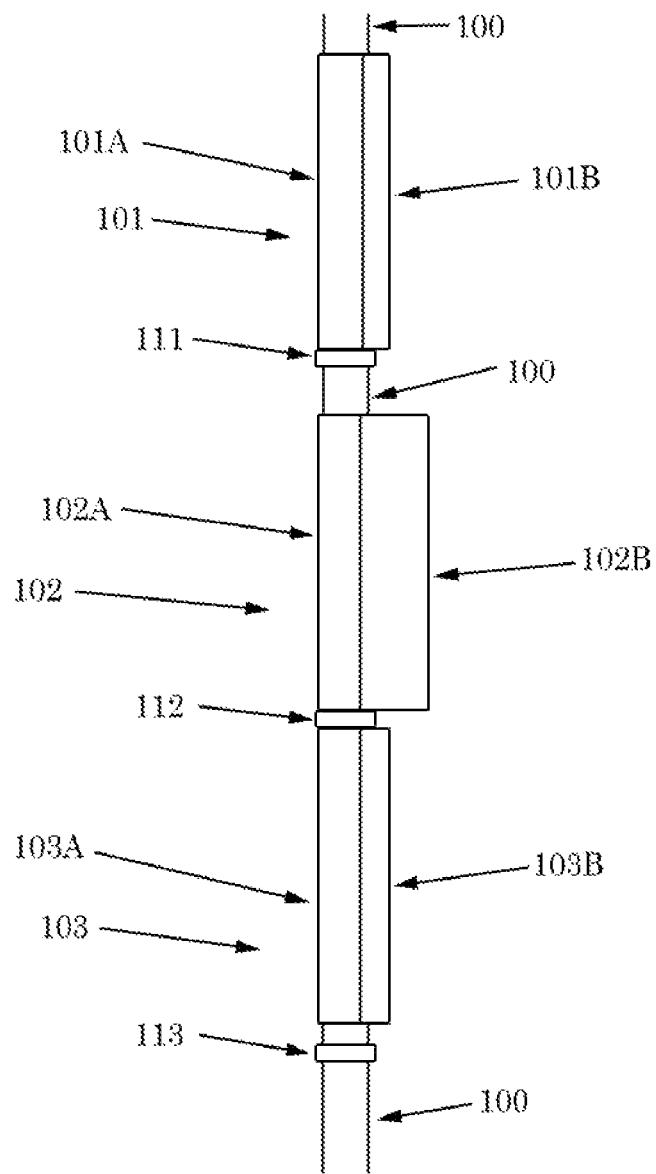
FIG. 1A is a side view of one embodiment of a tubular with both fairing and collars.

Referring now to the invention in more detail, FIG. 1A presents fairings 101, 102, and 103 and collars 111, 112, and 113 around tubular 100. Fairing 101 generally consists of nose part 101A and tail part 101B; fairing 102 consists of nose part 102A and tail part 102B; and fairing 103 consists of nose part 103A and tail part 103B.

Again referring to FIG. 1A, collars 111, 112, and 113 are clamped tightly around tubular 100. Fairings 101, 102, and 103 may be fixed or may be free to weathervane around tubular 100.

Still referring to FIG. 1A, nose part 101A and tail part 101B, nose part 102A and tail part 102B, and nose part 103A and tail part 103B may be connected by any suitable means including, but not limited to, fastening, joining, clamping, interference fitting, interlocking, welding, and chemical bonding.

Still referring to FIG. 1A, nose part 101A and tail part 101B, nose part 102A and tail part 102B, and nose part 103A and tail part 103B may be made of any suitable material including, but not limited to, metal, plastic, rubber or other elastomer, composite, fabric, or any combination thereof.

Figure 1B:
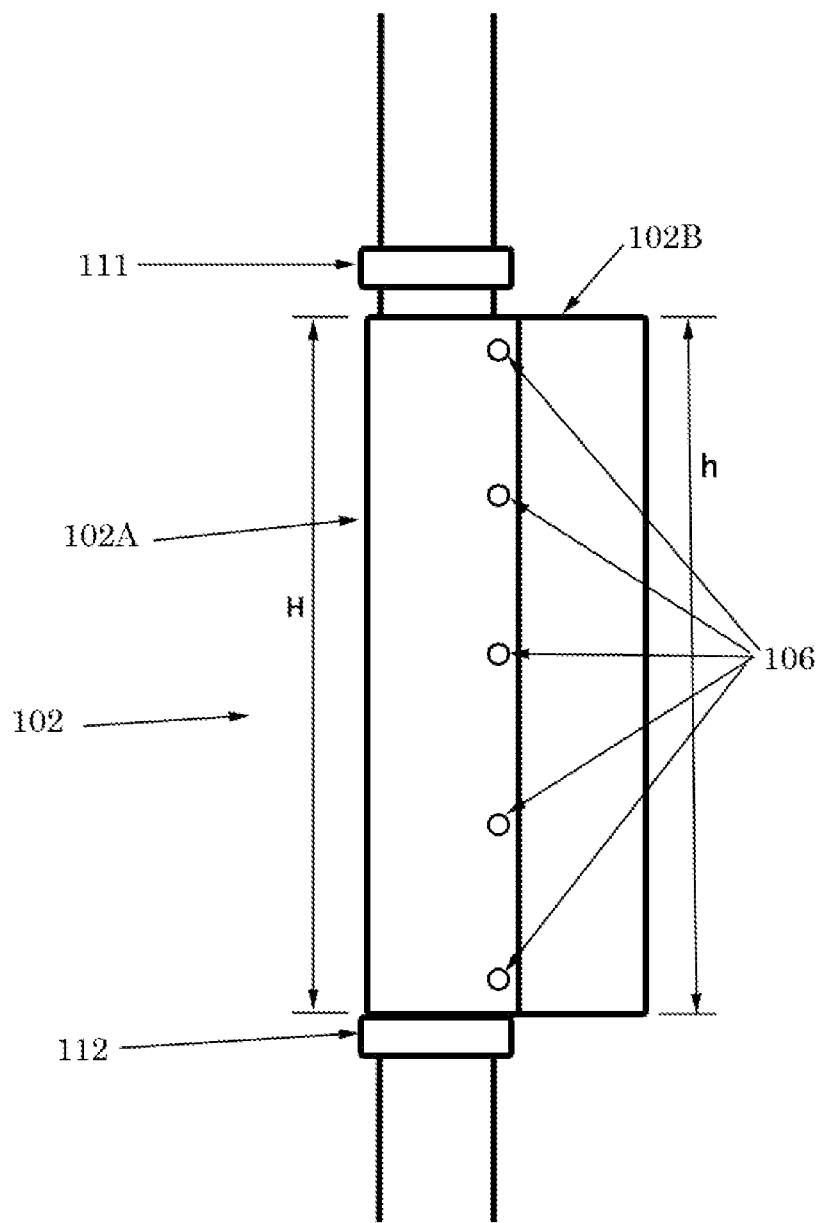
FIG. 1B is a side view of one embodiment of a fairing with two parts used for the body and fasteners for the connection.

Referring now to FIG. 1B, fairing 102, collar 111, and collar 112 are placed around tubular 100. Fairing nose 102A is connected to fairing tail 102B by fasteners 106. Fairing nose 102A, however, is considered a separate piece, or otherwise separable, from fairing tail 102B because the two pieces are not one integrally formed structure, but rather two pieces that must be connected together by fasteners 106.

Again referring to FIG. 1B, fairing nose 102A is connected to fairing tail 102B to form fairing 102. Any suitable fastener components or methods may be used including, but not limited to, bolts, nuts, washers, pins, rivets, snaps, hooks, welds, chemical bonding, or any combination thereof.

Figure 1C:
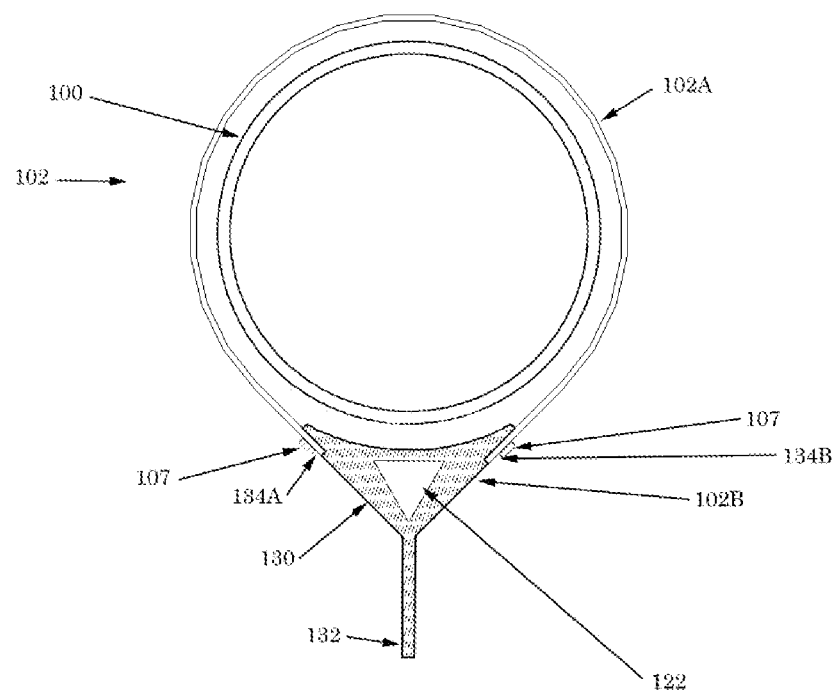
FIG. 1C is a top view of one embodiment of a fairing with two parts used for the body and fasteners for the connection.

Still referring to FIG. 1B, fairing nose 102A, fairing tail 102B, and fasteners 106 may be of any suitable size. Fairing nose 102A is dimensioned to encircle a portion of tubular 100 and may therefore be referred to herein as an encircling member. Fairing nose 102A may have a length sufficient to encircle less than an entire circumference of tubular 100. Typically, fairing nose 102A will encircle, or otherwise cover at least 180 degrees of the circumference of tubular 100, but less than an entire circumference. Fairing tail 102B also encircles, or otherwise covers, less than an entire circumference of tubular 100. For example, fairing tail 102B encircles a portion of the tubular circumference that is not covered by fairing nose 102A. Typically, the portion of tubular 100 covered by fairing tail 102B is less than that which is covered by fairing nose 102A. In addition, fairing nose 102A may have a height (H) that is the same as, or substantially the same as, a height (h) of fairing tail 102B. Fairing tail 102B may be of any suitable shape and may be of any suitable size. For example, fairing tail 102B may have a base portion 130 and a fin portion 132 as shown in FIG. 1C. The base portion 130 may have a substantially triangular cross-sectional shape and be dimensioned to contact and encircle tubular 100. Fin portion 132 may extend from the base portion 130 in a direction normal to tubular 100, and have a cross-sectional shape of a thin, elongated rectangle.

Still referring to FIG. 1B, fairing nose 102A, fairing tail 102B, and fasteners 106 may be of any suitable material including, but not limited to, metal, plastic, rubber or other elastomer, composite, fabric, or any combination thereof.

Referring now to FIG. 1C, fairing 102 is placed around tubular 100 and consists of fairing nose 102A and fairing tail 102B. Insertion members 107 (e.g. screws) are shown attaching a first end 134A and a second end 134B of fairing nose 102A (or encircling member) to fairing tail 102B. For example, the base portion 130 of the fairing tail may include an opening or slot within which the screws 107 can be inserted. It is noted that the opening or slot is formed within, or through, the base portion 130, as opposed to within a separate structure attached to the base portion 130. Opening 122 is inside of tail 102B.

Again referring to FIG. 1C, fairing 102 is free to weathervane, or rotate, around tubular 100. Screws 107 attach fairing nose 102A fairly rigidly to fairing tail 102B. Opening 122 illustrates that tail 102B may be hollow (it also may be solid) or have one or more openings or voids inside. Screws 107 may be all installed prior to installation or one or more screws 107 may be installed during installation of fairing 102 about tubular 100. For example, screws 107 may be installed on one side of fairing tail 102B prior to installation so that, during installation, fairing nose 102A is rotated around tubular 100 and then the screws on the opposite side of fairing tail 102B are installed.

Still referring to FIG. 1C, fairing tail 102B may be of any suitable size or shape. For example, as previously discussed, fairing tail 102B may include a base portion 130 and a fin portion 132. The base portion 130 may have a substantially triangular cross-sectional shape and be dimensioned to contact and encircle a portion of tubular 100. Fin portion 132 may extend from the base portion 130 in a direction normal to tubular 100, and have a cross-sectional shape of a thin, elongated rectangle. For example, fairing tail 102B may be thin at the far edge (as shown at the bottom of FIG. 1C) or may be thick at the far edge. In other embodiments, fairing tail 102B may be triangular in cross section, circular in cross section, elliptical in cross section, rectangular in cross section, C-shaped in cross section, or of any suitable cross section. Fairing nose 102A will typically encircle around 180 degrees or more of tubular 100, and most typically will be around 180-300 degrees of tubular 100. Fairing nose 102A may encircle less than 180 degrees of tubular 100.

Still referring to FIG. 1C, fairing nose 102A, fairing tail 102B, and screws 107 may be of any suitable material including, but not limited to, metal, plastic, rubber or other elastomer, composite, fabric, or any combination thereof.

Figure 2A:
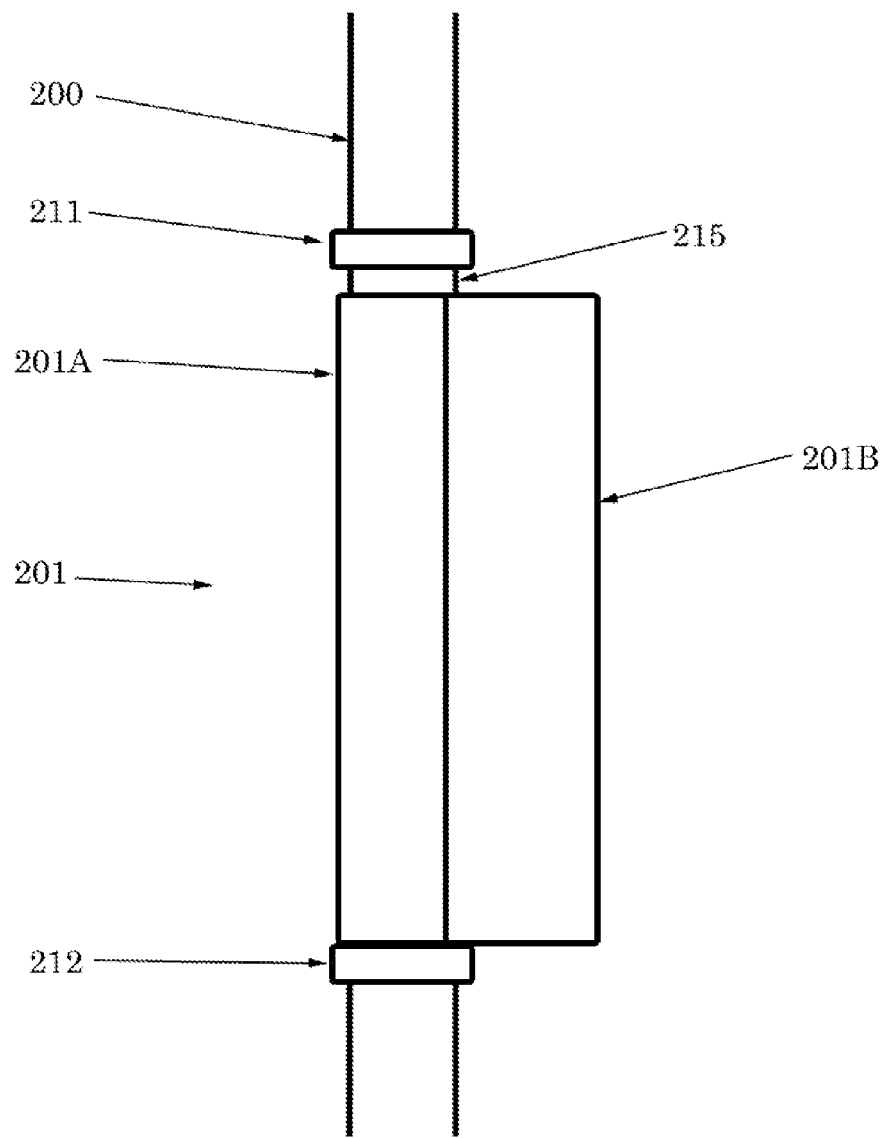
FIG. 2A is a side view of one embodiment of a fairing with two parts that interlock.

Referring now to FIG. 2A, fairing 201, collar 211, and collar 212 are placed around tubular 200. Fairing 201 consists of fairing nose 201A and fairing tail 201B. Collar 211 is separated from fairing 201 by gap 215.

Again referring to FIG. 2A, fairing nose 201A is inserted into a channel in fairing tail 201B. This aspect of the invention is illustrated further in FIG. 2B.

Figure 2B:
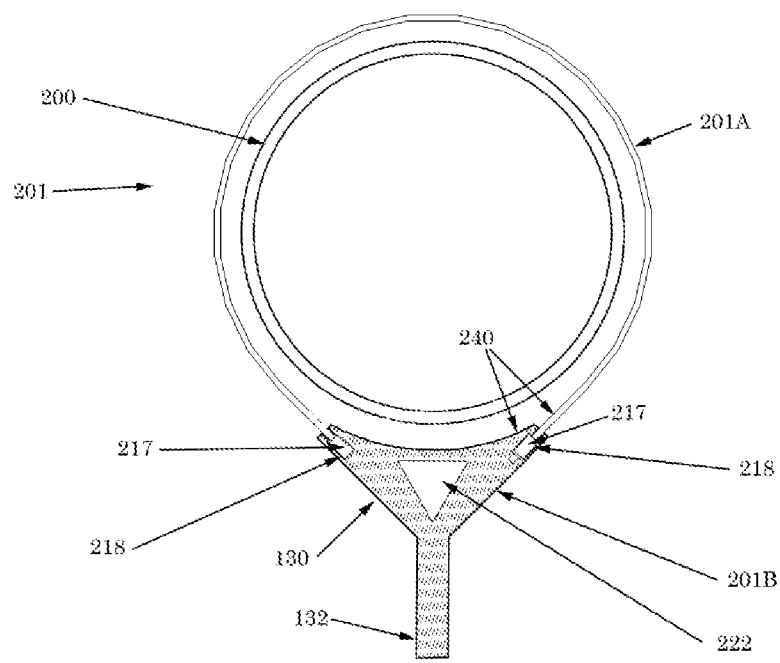
FIG. 2B is a top view of one embodiment of a fairing with two parts that interlock with the fairing nose entering the front of the fairing tail.

Referring now to FIG. 2B, fairing 201 is placed around tubular 200 and consists of fairing nose 201A and fairing tail 201B. Fairing nose 201A is attached to fairing tail 201B by sliding blocks 217 into channels 218. Fairing tail 201B has opening 222 present.

Again referring to FIG. 2B, by sliding blocks 217 (also referred to herein as insertion members) into channels 218 (also referred to herein as slots), fairing nose 201A is constrained from exiting fairing tail 201B unless it is slid along channels 218. It is noted that the channels 218 (or slots) are formed within, or through, the base portion 130, as opposed to within a separate structure attached to the base portion 130. The use of adjacent collars can be used to restrain the sliding of fairing nose 201A (see collars in FIG. 2A) or optional fasteners or other locks may be used (not shown). Any type fastener such as a cable tie or bolt and nut combination may be used to attach fairing nose 201A to fairing tail 201B. Any appurtenance on fairing nose 201A that is larger than channels 218 and residing above or below channels 218 can restrict the sliding of fairing nose 201A in one direction. While these appurtenances are not shown, they can consist of fasteners, other blocks or even be part of fairing nose 201A or fairing tail 201B. Blocks 217 may be attached to fairing nose 201A (by any suitable means) or may be molded or formed into fairing nose 201A. Blocks 217 may be continuous along the longitudinal axis of fairing 201 or may consist of discrete segments. Channels 218 may be molded into fairing tail 201B or be cut or formed into fairing tail 201B. Blocks 217 and channels 218 may run parallel to tubular 200 (again see FIG. 2A) or may run at an angle or helical in tubular 200 (but most commonly will run substantially parallel to tubular 200 (along the longitudinal axis of fairing 201. FIG. 2B shows fairing nose 201A entering the front 240 of fairing tail 201B (the front of fairing tail 201B is the part, or side(s), substantially facing the tubular).

Still referring to FIG. 2B, sliding blocks 217 and channels 218 may be of any suitable shape or size. The key is that by sliding blocks 217 into channels 218 in a direction normal to the page (vertically in FIG. 2A), fairing nose 201A is restrained in the cross sectional plane of FIG. 2B (horizontally in FIG. 2B). Any suitable cross sectional geometry that has block 217 being wider than the part of channel 218 adjacent to tubular 200 can fulfill the function of this aspect of the invention. A keyway type method may also be used. In addition, any type of fastener such as a cable tie or bolt and nut combination may be used to attach fairing nose 201A to fairing tail 201B.

Still referring to FIG. 2B, sliding blocks 217 may be of any suitable material including, but not limited to, metal, plastic, rubber or other elastomer, composite, fabric, or any combination thereof.

Figure 2C:
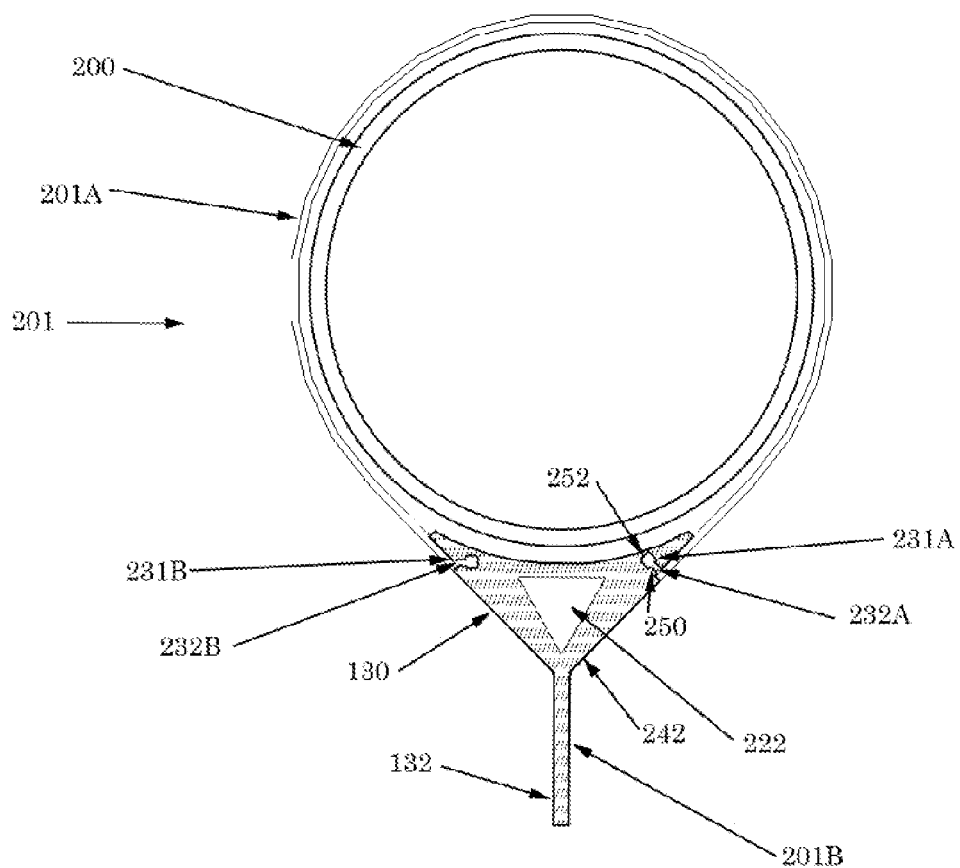
FIG. 2C is a top view of one embodiment of a fairing with two parts that interlock with the fairing nose entering the side of the fairing tail.

Referring now to FIG. 2C, fairing 201 is placed around tubular 200 and consists of fairing nose 201A and fairing tail 201B. Fairing nose 201A is attached to fairing tail 201B by appurtenances 232A and 232B sliding into channels 231A and 231B (also referred to herein as slots). It is noted that the channels 231A, 231B (or slots) are formed within, or through, the base portion 130, as opposed to within a separate structure attached to the base portion 130. Fairing tail has opening 222 present.

Again referring to FIG. 2C, this attachment method for fairing nose 201A and fairing tail 201B is similar to that of FIG. 2B except that: a) fairing nose 201A enters fairing block 201B through the side of fairing block 201B; b) appurtenances 232A and 232B are made of a thin portion 250 and a thicker portion 252; and c) appurtenances 232A and 232B enter into the outer surface or outer side 242 of fairing tail 201B (i.e. the surface of fairing tail 201B facing away from tubular 100), whereas blocks 217 in FIG. 2B enter in the front 240 of fairing tail 201B (i.e. the surface facing substantially toward the tubular). Note that appurtenance 232A extends at a different angle than appurtenance 232B. These changes illustrate that appurtenances 232A and 232B may be made of any suitable shape and may enter fairing nose 201A at any suitable angle. In the case of FIG. 2C, the design allows for the outer direction of fairing nose 201A to be parallel to the outer edge of fairing tail 201B. This could also be accomplished by the design shown in FIG. 2B, by imposing a simple bend in fairing nose 201A or by making blocks that are "L-shaped" or by any suitable means. More than one opening 222 may be present.

Still referring to FIG. 2C, appurtenances 232A and 232B may be of any suitable size or shape. Appurtenances 232A and 232B may each be made of a single piece, may each be made of multiple pieces, or may be molded or formed into fairing nose 201A. Channels 231A and 231B will typically be made just a little a larger than appurtenances 232A and 232B. All of the properties ascribed to blocks 217 and channels 218 in FIG. 2B may be applied to appurtenances 232A and 232B as well as channels 231A and 231B, respectively.

Still referring to FIG. 2C, appurtenances 232A and 232B may be of any suitable material including, but not limited to, metal, plastic, rubber or other elastomer, composite, fabric, or any combination thereof.

Figure 2D:
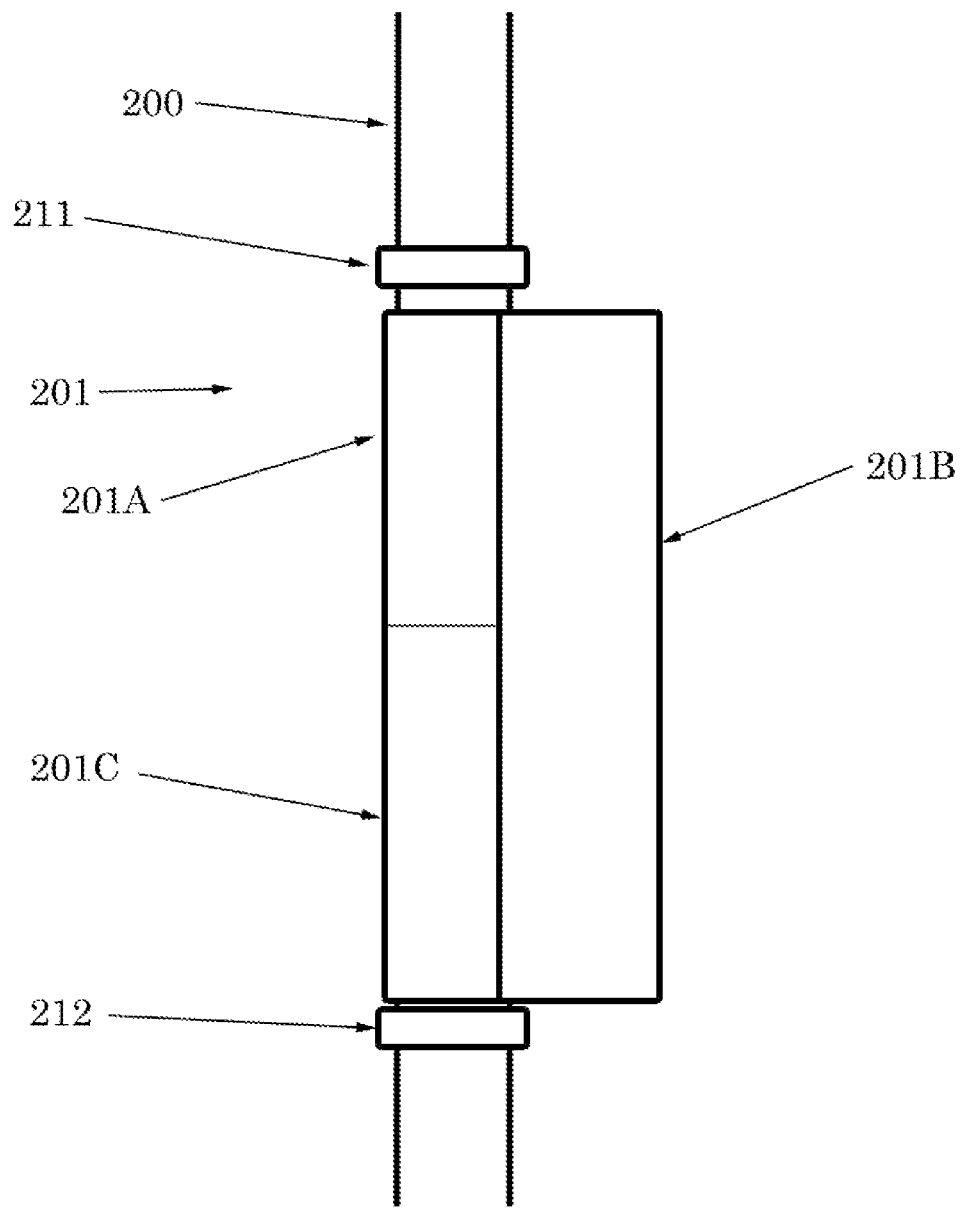
FIG. 2D is a side view of one embodiment of a fairing with two nose parts that interlock with a tail part.

Referring now to FIG. 2D, fairing 201 and collars 211 and 212 are placed around tubular 200. Fairing 201 consists of fairing nose pieces 201A and 201C along with fairing tail 201B.

Again referring to FIG. 2D, this figure illustrates that the nose of fairing 201 may be made of more than one piece, in this case fairing nose pieces 201A and 201C. These pieces may each be slid into fairing tail 201B (as illustrated in FIGS. 2A, 2B, and 2C) or may be attached to each other by any suitable means and slid into fairing tail 201B.

Still referring to FIG. 2D, fairing nose pieces 201A and 201C may be of any suitable length and need not be identical in length or means of attachment to fairing tail 201B.

Still referring to FIG. 2D, fairing nose pieces 201A and 201C may be of any suitable material including, but not limited to, metal, plastic, rubber or other elastomer, composite, fabric, or any combination thereof.

Figure 2E:
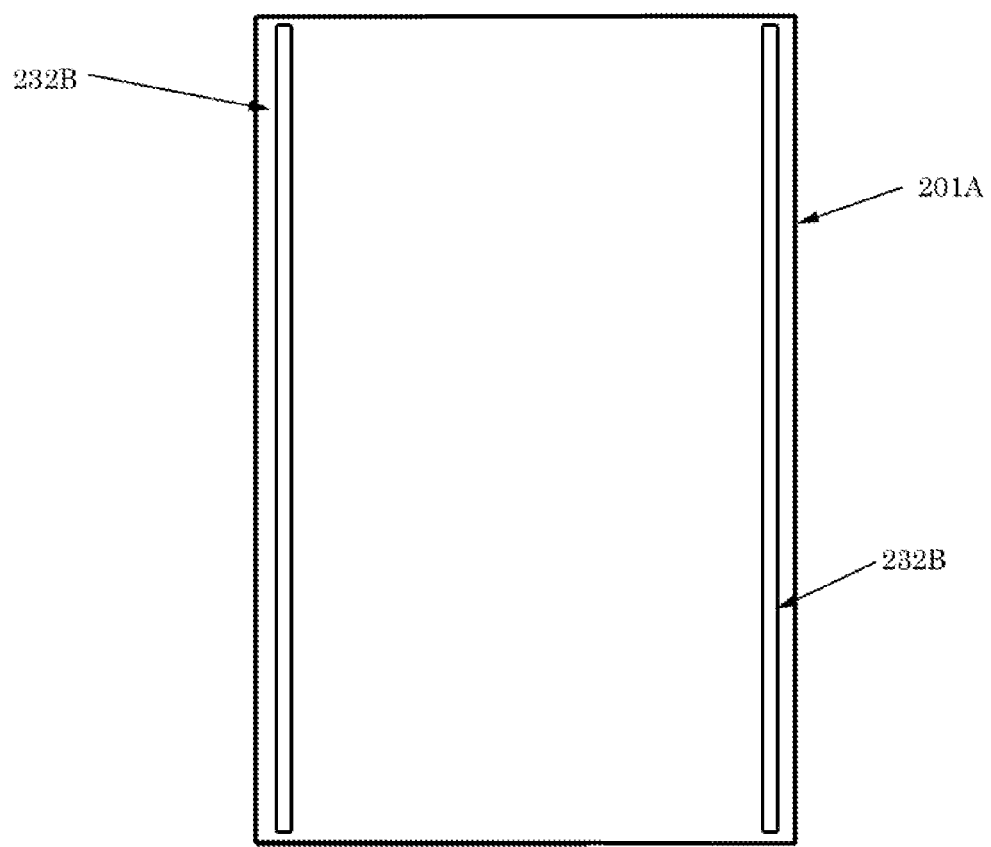
FIG. 2E is a side view of one embodiment of a fairing nose that is initially flat.

Referring now to FIG. 2E, fairing nose 201A is shown with appurtenances 232A and 232B extending along an entire height of fairing nose 201A. Said another way, appurtenances 232A and 232B are shown as continuous pieces that extend from one end to another of fairing nose 201A.

Again referring to FIG. 2E, this figure shows fairing nose 201A as a flat sheet that is simply bent around tubular 200 (or simply bent) to form the shape shown in FIGS. 2B and 2C. This illustrates that fairing nose 201A may be flat until installation, or may be heated, formed, rolled or a combination thereof to curve it prior to installation.

Figure 2F:
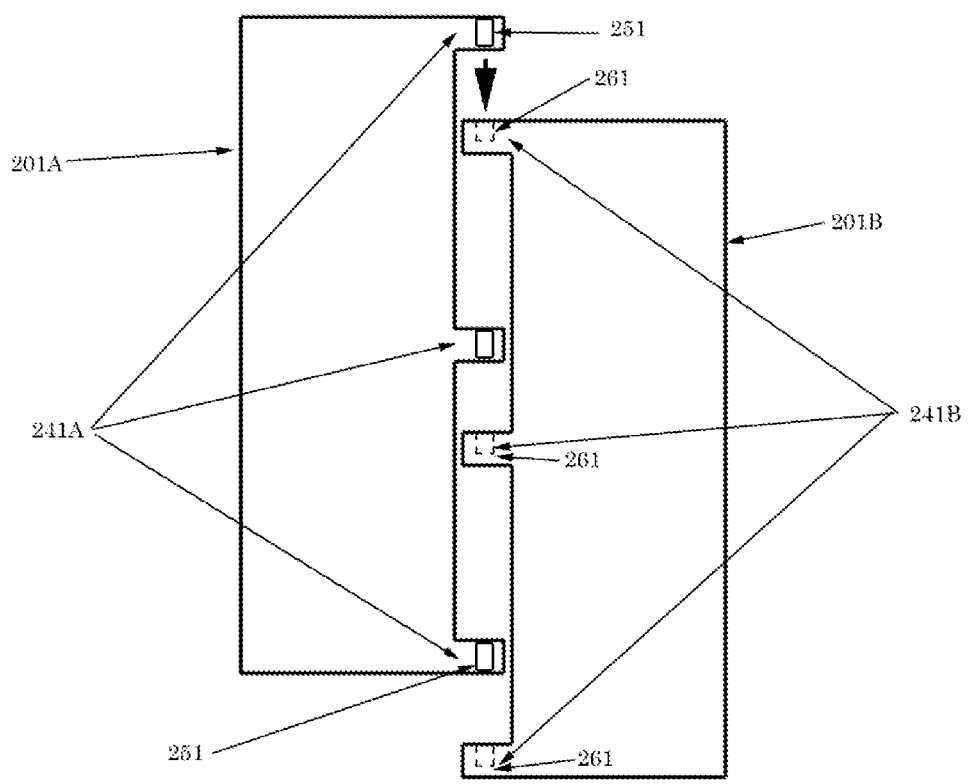
FIG. 2F is an illustration of one embodiment of a fairing nose and fairing tail being installed using interlocking.

Referring now to FIG. 2F, this figure is an illustration of fairing nose 201A being installed into fairing tail 201B. In this embodiment, a set of tabs 241A reside on fairing nose 201A and a set of tabs 241B reside on fairing tail 201B. Set of tabs 241A and set of tabs 241B may be any type of flap, protrusion or other similar appendage extending from an edge (e.g an edge which is parallel to the tubular 200) of the fairing nose 201A and fairing tail 201B, respectively. Appurtenances 251 are shown on fairing nose 201A. Appurtenances 251 may be any type of structure that protrudes from the surface of each of the tabs within the set of tabs 241A, for example, be similar to appurtenances 232A and 232B previously discussed in reference to FIG. 2C. It is further noted that although three tabs within each of the set of tabs 241A, 241B are shown, any number of tabs, for example more or less, may be used.

Again referring to FIG. 2F, in order to attach fairing nose 201A to fairing tail 201B, fairing nose 201A is moved downward (in the direction of the arrow) so that appurtenances 251 may slide into channels 261 (also referred to herein as slots) in fairing tail 201B. It is noted that the channels 261 (or slots) may be formed within, or through, the base portion 130, as opposed to within a separate structure attached to the base portion 130. This figure also illustrates that fairing nose 201A may have discrete tabs 241A so that the engaging edge(s) of fairing nose 201A may be straight or have tabs (there is no limitation on the geometry of the engaging edges of fairing nose 201A nor do both edges have to be the same). Similarly, fairing tail 201B may be discrete tabs 241B so that the engaging edges of fairing tail 201B may be straight or have tabs (there is also no limitation on the geometry of the engaging edges of fairing tail 201B nor do both edges have to be the same). Fairing nose 201A may be fastened to fairing tail 201B in addition to, or in place of, the appurtenances 251. For example, the middle appurtenance 251 may be replaced by fastener so that, once installed, fairing nose 201A may not slide up or down relative to fairing tail 201B.

Still referring to FIG. 2F, tabs 241A and tabs 241B may be of any suitable size or shape. Appurtenances 251 may have any of the properties of appurtenances 232A and 232B of FIG. 2E.

Still referring to FIG. 2F, tabs 241A and 241B may be formed or molded as part of fairing nose 201A or may be attached separately to fairing nose 201A. Tabs 241A and 241B may be made of any suitable material including, but not limited to, metal, plastic, rubber or other elastomer, composite, fabric, or any combination thereof.

Figure 2G:
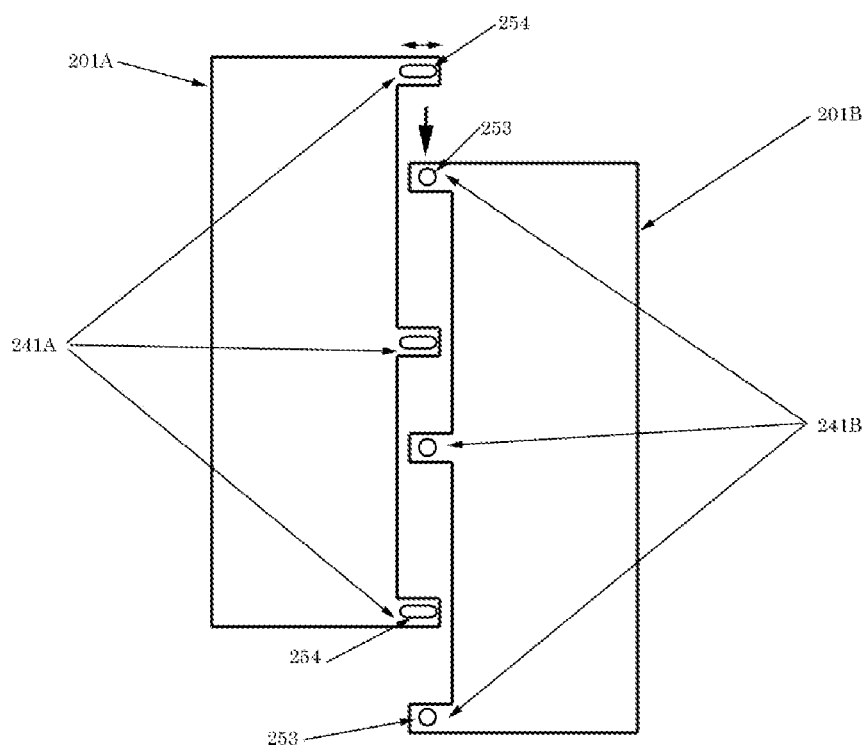
FIG. 2G is an illustration of one embodiment of a fairing nose and fairing tail being installed using fastening.

Referring now to FIG. 2G, this figure is an illustration of fairing nose 201A being installed into fairing tail 201B. Tabs 241A reside on fairing nose 201A and tabs 241B reside on fairing tail 201B. Slots 254 are present on fairing nose 201A and holes 253 are present on fairing tail 201B.

Again referring to FIG. 2G, by using slots 254 on fairing nose 201A, the location of fairing nose 201A relative to fairing tail 201B may be controlled. For example, the annulus between fairing 102 and tubular 100 in FIG. 1C may be altered simply by sliding fairing nose 201A relative to fairing tail 201B and inserting fasteners through the desired location of slots 254 into holes 253.

Still referring to FIG. 2G, slots 254 and holes 253 may be of any suitable size and shape.

Figure 2H:
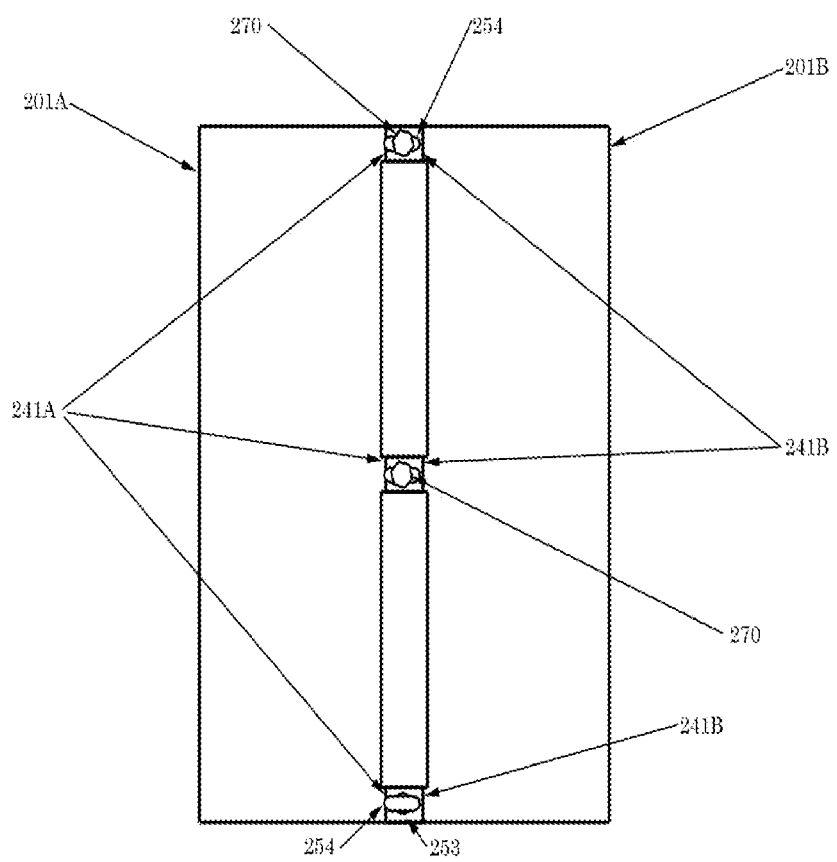
FIG. 2H is an illustration of one embodiment of the fairing nose and fairing tail of FIG. 2G being installed using fasteners.

FIG. 2H illustrates the embodiment of FIG. 2G with the slots 254 and holes 253 aligned so that fasteners 270 can be inserted through the desired location of the slots 254 and holes 253 to secure the fairing nose 201A to the fairing tail 201B. Fasteners 270 may be any sort of fastening mechanism suitable for fastening fairing nose 201A to fairing tail 201B as described (e.g. a bolt, screw, pin or the like).

Figure 3:
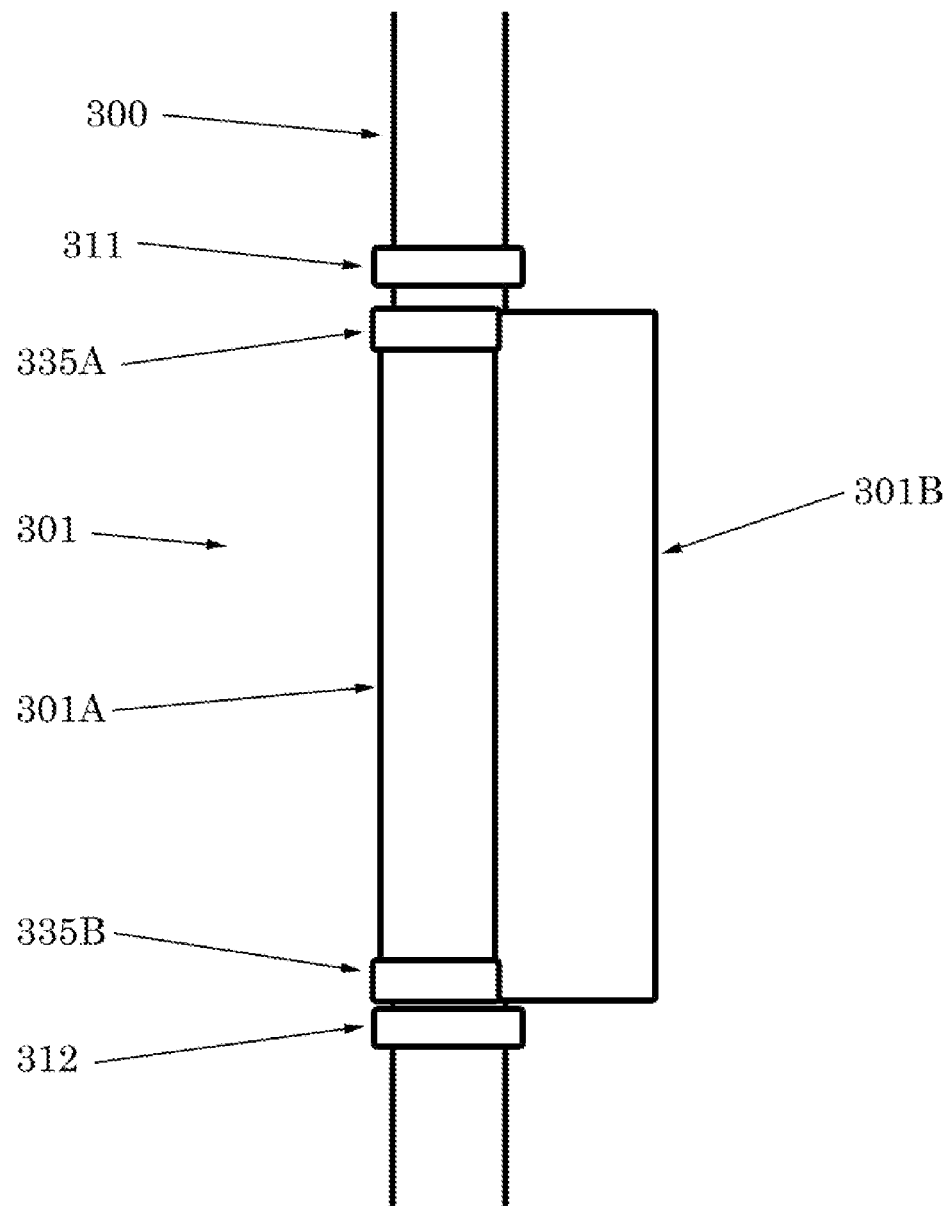
FIG. 3 is a side view of one embodiment of a fairing, nose, and two straps.

Referring now to FIG. 3, fairing 301, collar 311, and collar 312 are placed around tubular 300. Fairing 301 consists of fairing nose 301A, fairing tail 301B, and straps 335A and 335B.

Again referring to FIG. 3, this figure illustrates that other structures such as straps 335A and 335B may be used. Fairing nose 301A may be attached to straps 335A and 335B which are, in turn, attached directly to fairing tail 301B. In short, any number of intermediate or adjacent structures may be used to attach fairing nose 301A to fairing tail 301B.

Still referring to FIG. 3, straps 335A and 335B may be of any quantity and may be of any suitable size or shape. Typically, straps 335A and 335B will surround a portion of the circumference of tubular 300.

Still referring to FIG. 3, straps 335A and 335B may be made of any suitable material including, but not limited to, metal, plastic, rubber or other elastomer, composite, fabric, or any combination thereof.

Figure 4A:
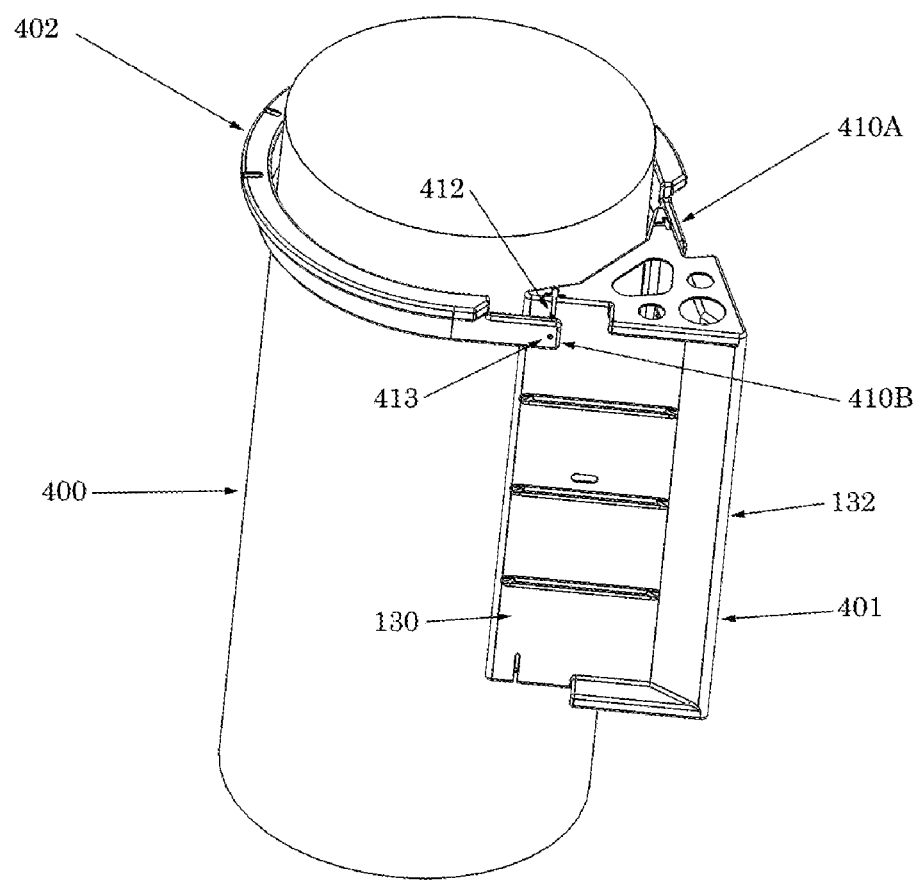
FIG. 4A is a perspective view of one embodiment of a tail fairing and a strap with slots in the tail fairing.

Referring now to another embodiment, FIG. 4A illustrates a fairing tail 401 that is held adjacent to tubular 400 by strap 402 through slotted connections 410A and 410B.

Again referring to FIG. 4A, only one strap 402 holding tail 401 against tubular 400 is shown, however multiple straps may be used. For applications where sliding of tail 401 and strap 402 relative to tubular 400 is desired to be minimized, a collar may be clamped around tubular 400 above and/or below tail 401 (the collar is not shown here). Tail 401 is free to rotate around tubular 400 since strap 402 does not clamp to tubular 400. Slotted connections 410A and 410B represent connections that utilize one or more slots in tail 401 to connect strap 402 to tail 401.

Still referring to FIG. 4A, each of slotted connections 410A and 410B consist of a slot 412 and male piece 413 (also referred to herein as an insertion member or arm member) attached to strap 402 that slides into slot 412 along the tubular 400 longitudinal axis. It is noted that slot 412 may be formed within, or through, the base portion 130, as opposed to within a separate structure attached to the base portion 130. In this aspect, the male piece 413 may extend from an inner surface of strap 402 (i.e. surface facing tubular 400) in a substantially perpendicular direction to the strap surface such that it extends toward the outer surface of tail 401 (i.e. the surface of tail 401 facing strap 402). The male piece 413 is sufficiently large so that it can slide along the longitudinal or circumferential axes of tubular 100 but cannot easily be removed by pulling it normal to the longitudinal axis of tubular 400 or normal to the face of tail 401 to which it is attached.

Still referring to FIG. 4A, each component shown may be made of any suitable size and is not limited to the size or shapes shown in FIG. 4A. Any number of straps 402 may be used and the straps may even consist of, or cover, the entire nose of a fairing (i.e. the entire length of tubular 400 may be covered along the length of tail 401). Strap 402 may be of any suitable height and cross sectional shape. Slotted connections 410A and 410B may utilize a bushing in strap 402 which can provide strength. In addition, most existing straps already have bushings so that these existing straps may easily be retrofitted with the designs described herein. Similarly, existing tails may be retrofitted with this design.

Still referring to FIG. 4A, each component shown may be of any suitable material including, but not limited to, plastic, wood, metal, fiberglass or other composites, elastomer, and synthetics. Each component may be made of a single material or may be made of multiple materials. Each component in FIG. 4A may be made of the same material or various components may be made of different materials.

Figure 4B:
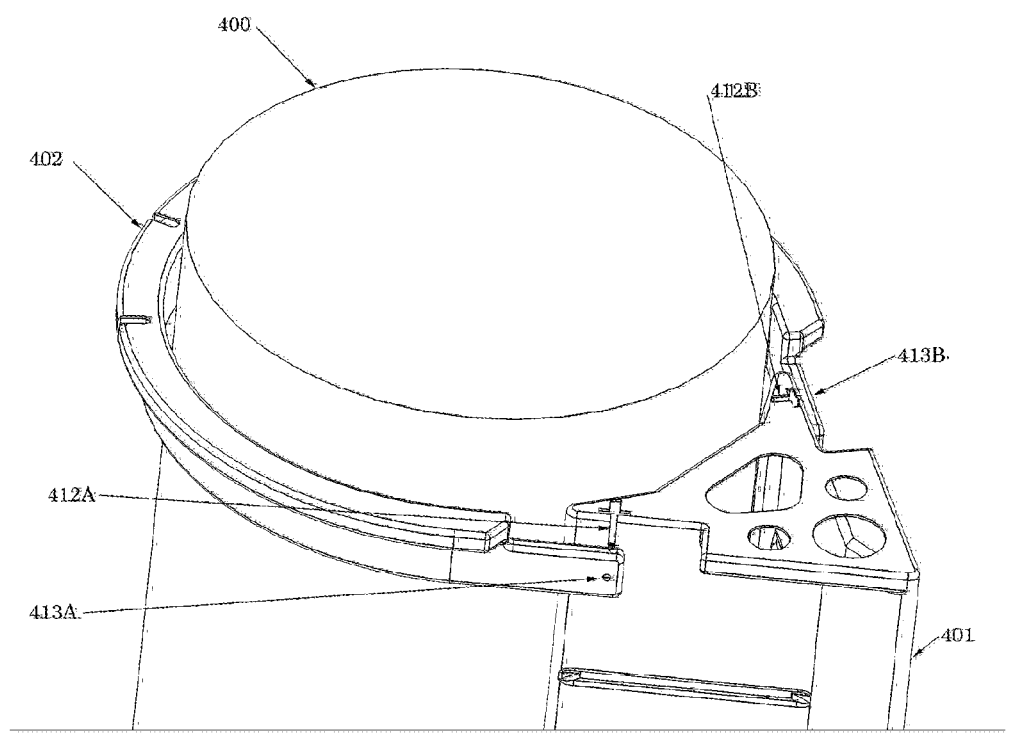
FIG. 4B is close-up view showing the slots of FIG. 4A.

Referring now to FIG. 4B, this figure is a close-up of FIG. 4A and shows tail 401 held adjacent to tubular 400 by strap 402. Slots 412A and 412B are present in tail 401 and male pieces 413A and 413B are used to connect strap 402 to tail 401.

Again referring to FIG. 4B, male pieces 413A and 413B may be slid into slots 412A and 412B at the end of tail 401 but are shaped so that they may not be pulled out of tail 401 unless they are slid along slots 412A and 412B.

Still referring to FIG. 4B, each component may be of any suitable size or shape. For example, slots 412A and 412B may be of any length and may extend in any direction along tail 401. Slots 412A and 412B may be of constant width and depth or may a width or depth that varies. Male pieces 413A and 413B may be of constant width and depth or may a width or depth that varies. Any number of slots 412A and 412B and male pieces 413A and 413B may be used for tail 401, even though only two are shown for strap 402.

Still referring to FIG. 4B, male pieces 413A and 413B may be made of any suitable material including, but not limited to: metal, plastic, elastomer, fiberglass or other composite, or wood. Male pieces 413A and 413B may be made of various materials and components. Male pieces 413A and 413B may be made of a single component or made of multiple components. Male pieces 413A and 413B may be made of a single material or made of multiple materials.

Figure 4C:
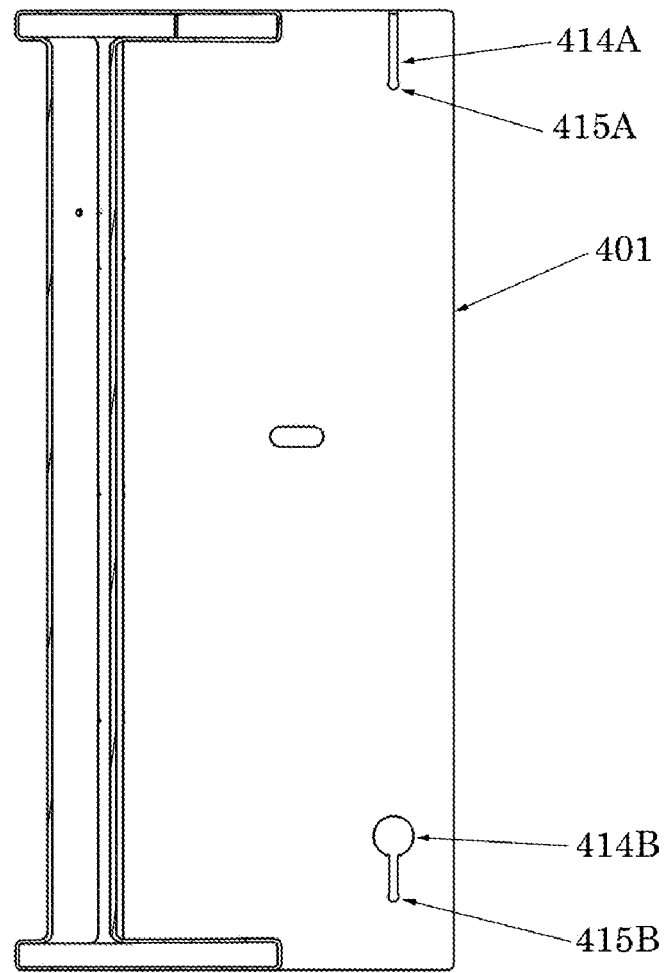
FIG. 4C is a side view of the tail fairing of FIG. 4A with two different types of slots.

Referring now to FIG. 4C, this figure shows one side of tail 401 with slot 414A with optional end 415A and slot 414B with optional end 415B. It is noted that the slots 414A, 414B may be formed within, or through, the base portion 130, as opposed to within a separate structure attached to the base portion 130.

Again referring to FIG. 4C, this figure illustrates how various slot geometries may be used. Slot 414A provides for an opening at the top of tail 401 so that a strap may be slid into the slot from the top of tail 401. Slot 414B provides an opening on the side of tail 401 (i.e. through a face of tail 401) so that a strap may be slid into the slot through the side (or face) of tail 401. Any type of slot may be utilized and the slots on tail 400 may be different even for the same strap. For example, slot 414A may be L-shaped or Z-shaped.

Still referring to FIG. 4C, optional ends 415A and 415B show that the slots need not be uniform along their length. For example, the optional end 415A may consist of a hole with a diameter that is different than the width of slot 414A. Other geometries are also possible for optional ends 415A and 415B including changes in direction in slots 414A and 414B and changes in shape of slots 414A and 414B.

Figure 4D:
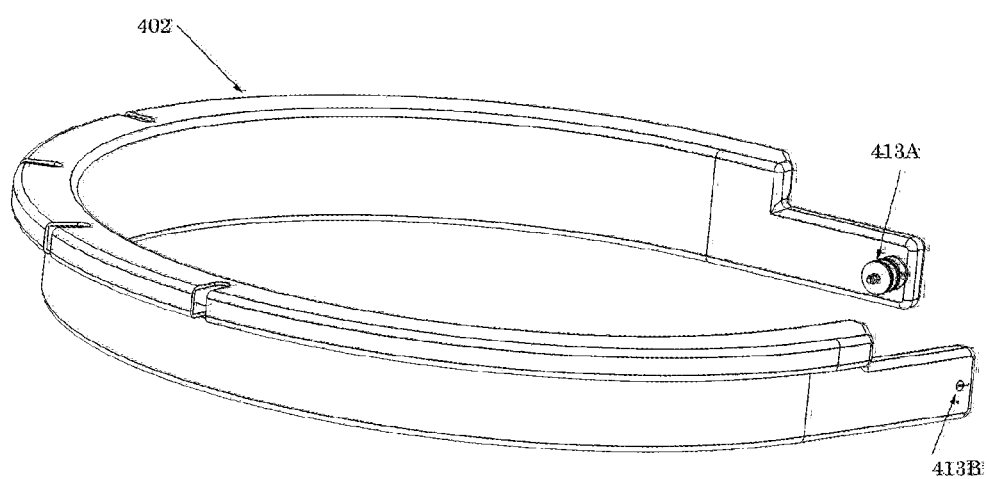
FIG. 4D is a perspective view of one embodiment of a fairing strap with a male piece.

Referring now to FIG. 4D, this figure shows strap 402 with male pieces 413A and 413B.

Figure 4E:
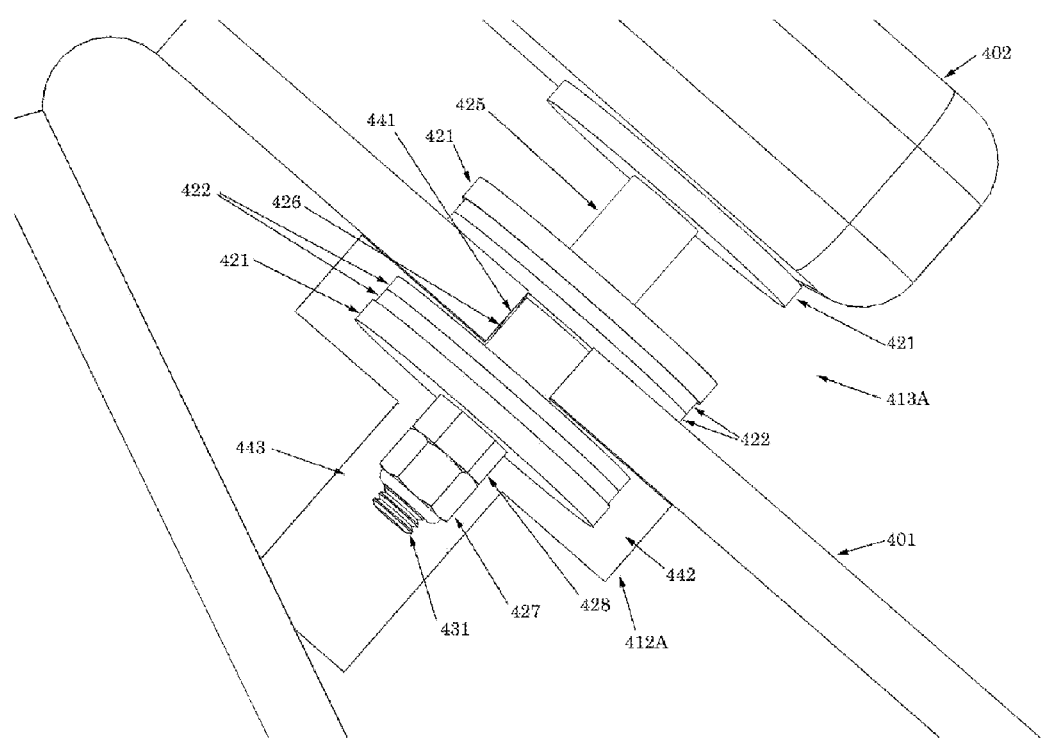
FIG. 4E is a perspective view of one embodiment of a male piece on a fairing strap that is slid into a slot in a tail fairing.

Again referring to FIG. 4D, this figure shows male pieces 413A and 413B consisting of a fastener with various hardware attached to the fastener (more detail on the fastener is shown in FIG. 4E). While FIG. 4D shows a single fastener near each end of strap 402, multiple fasteners may be used near each end of strap 402 and other geometries may be utilized for male pieces 413A and 413B. For example, male pieces 413A and 413B may be molded into strap 402, clamped onto strap 402, or attached by any suitable means. Male pieces 413A and 413B may be comprised of fastener components but may also be comprised of other components such as clamps, clips, pins, blocks, and other appurtenances. The invention is not limited to the geometry of male pieces 413A and 413B.

Referring now to FIG. 4E, this figure shows strap 402 attached to tail 401 using male piece 413A in slot 412A. Male piece 413A is fairly complex and consists of bolt 431, metal washers 421, rubber washers 422, strap spacer 425 and slot spacer 426, jam nut 428, and lock nut 427. Slot 412A consists of tail wall opening 441, wide opening 442, and narrow end opening 443.

Again referring to FIG. 4E, as male piece 413A is slid into slot 412A, slot spacer 426 travels through tail wall opening 441. The presence of the washers in wide opening 442 prevent male piece 413A from exiting tail 401 normal to the tail (i.e. male piece 413A is only free to exit tail 401 by sliding male piece 413A along slot 412A).

Still referring to FIG. 4E, many components of male piece 413A are optional but may have a desirable function. For example, metal washers 421 are used to give strength while rubber washers 422 soften the stresses that metal washers 421 may impose upon tail 401 or strap 402. Strap spacer 425 and slot spacer 426 are optional but can be used to protect the threads of bolt 431 and also keep the threads of bolt 431 from cutting adjacent pieces such a tail 401. Jam nut 428 and lock nut 427 are optional but one or more may be used to keep the other components in place. Narrow end opening 443 is optional but may be cut as narrow to minimize the cutting of the material for slot 412A. Strap spacer 425 is optional but may be used to space the strap away from the tail or used as a surface for auxiliary connections for keeping male piece 413A from sliding out of slot 412A. Both strap spacer 425 and slot spacer 426 are also useful to keep metal washers 421 and rubber washers 422 in place prior to inserting male piece 413A into slot 412A. As noted above, other hardware may be substituted for one or more components and most components are optional. For example, an entire male piece may be molded into the geometry of strap 402 or clamped onto strap 402. This invention is not limited to the composition of male piece 413A or the geometry of slot 412A. All or part of slot 412A or tail wall opening 441 may be reinforced with metal, plastic, elastomer, composite, or any other suitable reinforcing material. This reinforcement will typically consist of a plate or strip of material that is attached to tail 401.

Still referring to FIG. 4E, bolt 431, metal washers 421, rubber washers 422, strap spacer 425, slot spacer 426, jam nut 428, and lock nut 427 may be made of any suitable shape and material. Similarly, tail wall opening 441, wide opening 442, and narrow end opening 443 may be made of any suitable geometry. In particular, slot spacer 426 may have a square or rectangular cross section to inhibit rotation of male piece 413A and strap 402 or to inhibit strap 402 coming out of slot 412A (bolt 431 may also be cut to have a square or rectangular shaped segment). In general, male piece 413A will have at least one component that passes through tail wall opening 441 (in FIG. 4E, this is slot spacer 426) and at least one component that is larger in cross section than tail wall opening 441 but able to pass into wide opening 442 (in FIG. 4E, this is any of metal washers 421 or rubber washers 422 or even jam nut 428 or lock nut 427).

Still referring to FIG. 4E, other appurtenances or auxiliary devices may be used to assist in keeping male piece 413A from sliding out of slot 412A. For example, a cable tie may be strung through holes on each side of slot 412A and tightened to restrict sliding of male piece 413A. Another example restraining device is the use of a carbineer attached to a short rope that restricts sliding of male piece 413A.

Figure 5A:
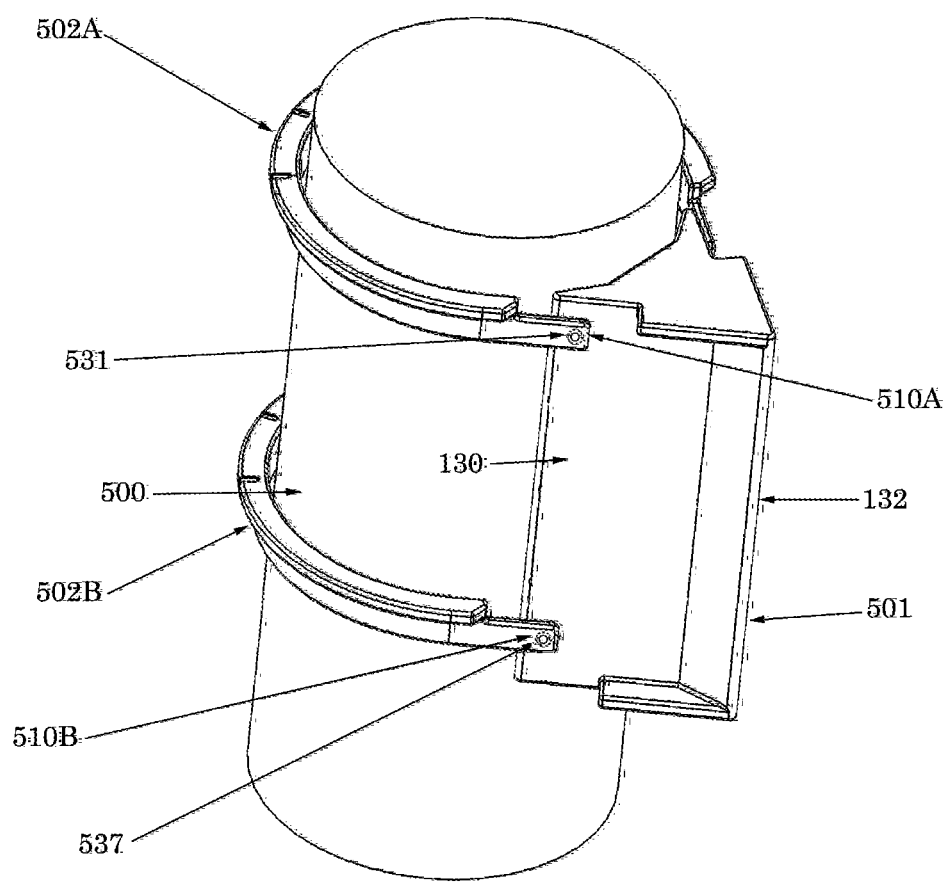
FIG. 5A is a perspective view of one embodiment of a fairing tail with two straps.

Referring now to FIG. 5A, FIG. 5A presents fairing tail 501 secured by straps 502A and 502B around tubular 500. A collar or clamp (not shown) would normally be located under tail 501 to keep tail 501 and straps 502A and 502B from sliding down tubular 500. Strap 502A is attached to tail 501 at connection 510A while strap 502B is attached to tail 501 at connection 510B. Lynch pin 531 is shown attached to strap 502A as part of connection 510A while lynch pin 537 is shown attached to strap 502B as part of connection 510B.

Again referring to FIG. 5A, tail 501 and straps 502A and 502B are free to rotate around tubular 500. Straps 502A and 502B may be attached to any location on tail 501. While FIG. 5A shows two straps used to attach tail 501 to tubular 500, any number of straps may be used. Each strap may be approximately identical or may be different. For example, one strap may be similar to that shown in FIG. 5A, while a second strap may consist of a simple rope or cable. Tail 501 and straps 502A and 502B may be manufactured by any suitable means including, but not limited to, rotational molding, injection molding, and extrusion. More details on the connection method for attaching straps 502A and 502B to tail 501 are described below.

Figure 5B:
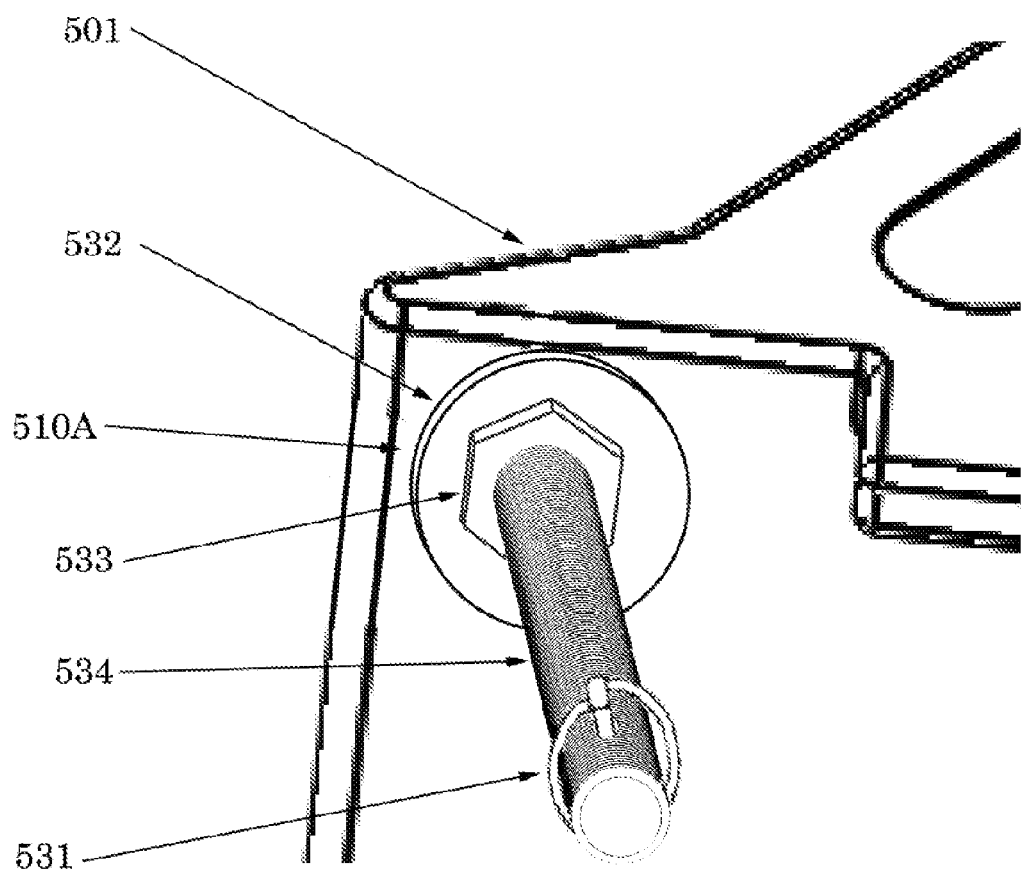
FIG. 5B is a close-up of the attachment method used in FIG. 5A.

Referring now to FIG. 5B, this figure is a close-up of the attachment of the top strap in FIG. 5A, and shows connection 510A and tail 501. Connection 510A consists of various components which are bolt 534, nut 533, washer 532, and lynch pin 531. Lynch pin 531 is inserted through a hole that is in bolt 534.

Again referring now to FIG. 5B, more than one connection 510A may be attached to tail 501 and should consist of at least a bolt and a nut. Both the nut and the washer are optional (since a pin is used on the far end, a nut is not required). Other pins may be used in place of lynch pin 531 and various components may be mixed and matched to make up a connection. For example, more than one lynch pin may be used; more than one washer may be used; a lynch pin may be used on one bolt with a different pin or fastener used on another bolt; etc. Possible pins include, but are not limited to, wire lock pins, clevis pins, cotter pins, serrated pin, taper pins, quick-release pins, dowel pins, carbineers, shackles, fasteners such as bolts, screws, and nuts, and hitch pins. A split ring or a simple piece of rope that is inserted through the hole and tied around the bolt or tied to the tail or strap may be used too. In addition, other common fasteners may be used including, but not limited to, screws, nuts, bolts, hooks, and rope. Bolt 534 may be of any suitable size and may have a cross section that is round or not round. Bolt 534 may have part of its threads stripped off on the outer end. Other structures or fasteners may be used in place of, or in conjunction with, bolt 534, including pins, rods, and brackets.

Still referring to FIG. 5B, bolt 534, nut 533, washer 532, and lynch pin 531 may be made of any suitable material including, but not limited to, metal, plastic, and fiberglass.

Figure 5C:
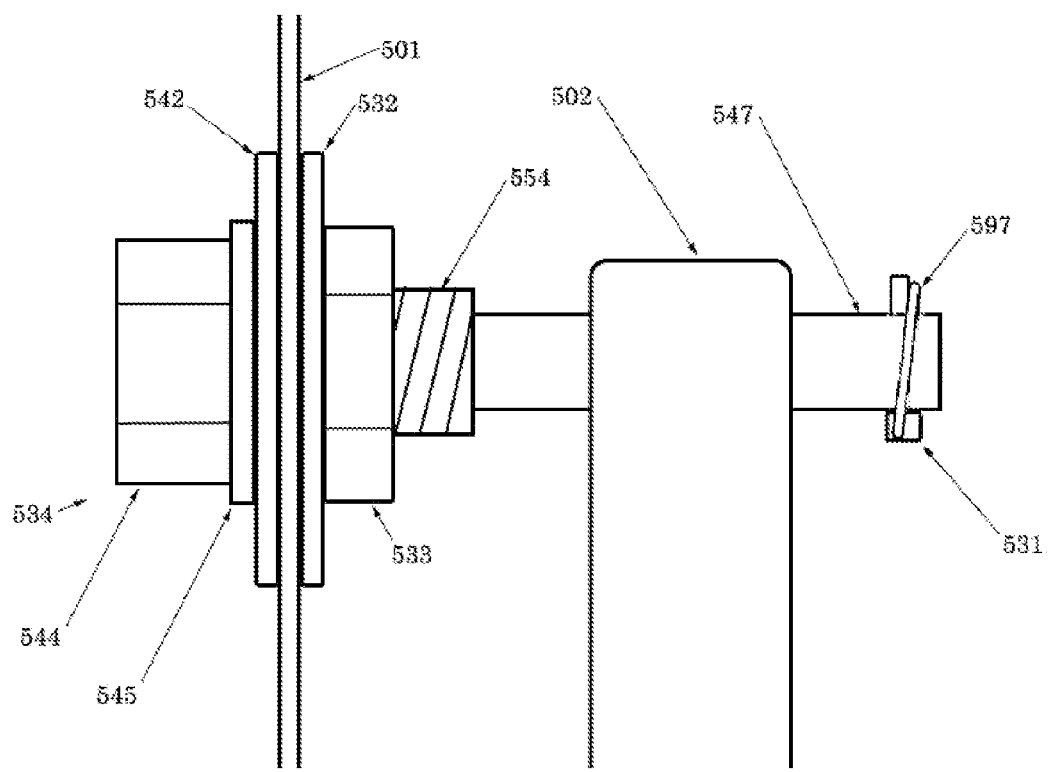
FIG. 5C is a side view of the attachment method used in FIG. 5A.

FIG. 5C is a close-up and side view of the attachment method. Bolt 534 is inserted through tail 501 and strap 502. Bolt 534 consists of bolt head 544 (which includes optional flange 545 as part of bolt head 544), threads 554, and the unthreaded shank 547. Inner washer 542, outer washer 532, and nut 533 are on bolt 534 and lynch pin 531 is inserted through a hole in unthreaded shank 547. Ring 597 is part of lynch pin 531.

Again referring to FIG. 5C, bolt 534 may be permanently attached to tail 501 with nut 533. Inner washer 542 and outer washer 532 are both optional (none, one, or both may be used; other washers may also be added) and may be used to add strength. During installation, strap 502 is slid onto bolt 534 and then lynch pin 531 is inserted into bolt 534 and ring 597 is pushed around the end of bolt 534 for a quick and secure connection (ring 597 acts like a spring when pushed around bolt 534 and requires force to retract).

Still referring to FIG. 5C, bolt 534 may be fully or partially threaded as shown. Inner washer 542 and outer washer 532 may be of any suitable thickness and diameter (and may also be non-circular). Bolt head 544 may or may not have a flange 545. As noted above, other pins and fasteners may be substituted for lynch pin 531. Bolt 534 may be of any suitable length. More than one bolt 534 may be used at a single strap location. Lynch pin 531 may be tied or connected to tail 501 or strap 502 by rope, cable, split rings, or any other suitable means so that it is not easily dropped or lost. Bolt 534 may be attached to tail 501 by any suitable means (i.e. without necessarily using nut 533), for example by chemical bonding, melting the materials together, clamping, or with interference.

Still referring to FIG. 5C, bolt 534, inner washer 542, outer washer 532, nut 533, and lynch pin 531 may be made of any suitable material including, but not limited to plastic, metal, fiberglass, and rubber/elastomer.

Figure 5D:
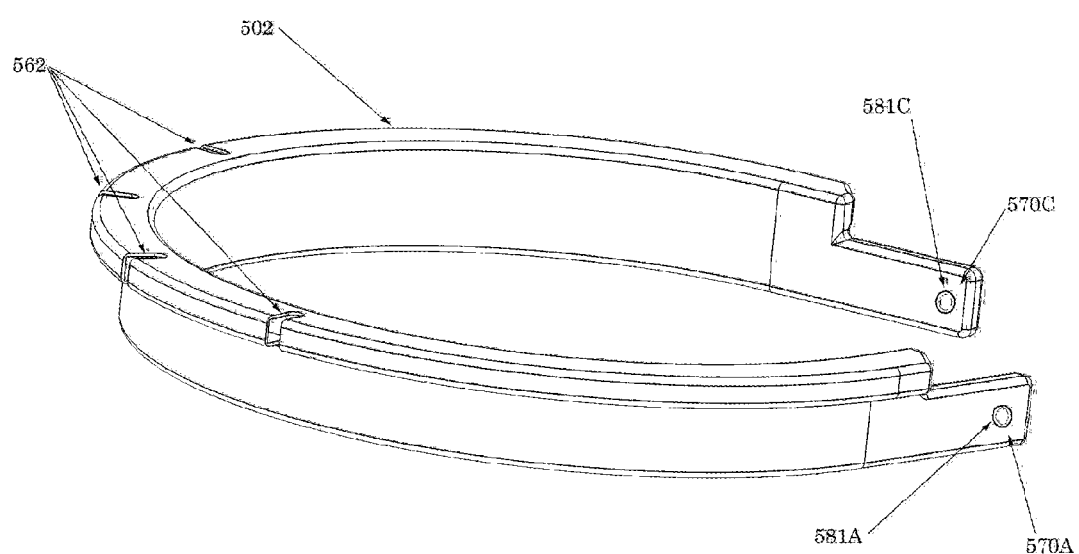
FIG. 5D is a perspective view of a strap with bushings.

Referring now to FIG. 5D, strap 502 has optional slots 562, openings 570A and 570C, and bushings 581A and 581C in openings 570A and 570C, respectively.

Again referring to FIG. 5D, openings 570A and 570C are used to insert strap 502 over a bolt or pin, as shown in FIG. 5A-FIG. 5C. Bushings 581A and 581C are used to provide strength for strap 502 as well as provide a relatively smooth surface.

Still referring to FIG. 5D, openings 570A and 570C, as well as bushings 581A and 581C, may be of any suitable size, shape, or geometry. Any number of openings and bushings may be used. For example, strap 502 may have multiple openings at each end so that the same strap may accommodate underlying tubulars of different diameters. Bushings 581A and 581C may be made of any suitable material including, but not limited to, plastic, metal, fiberglass, and rubber/elastomer.

Figure 5E:
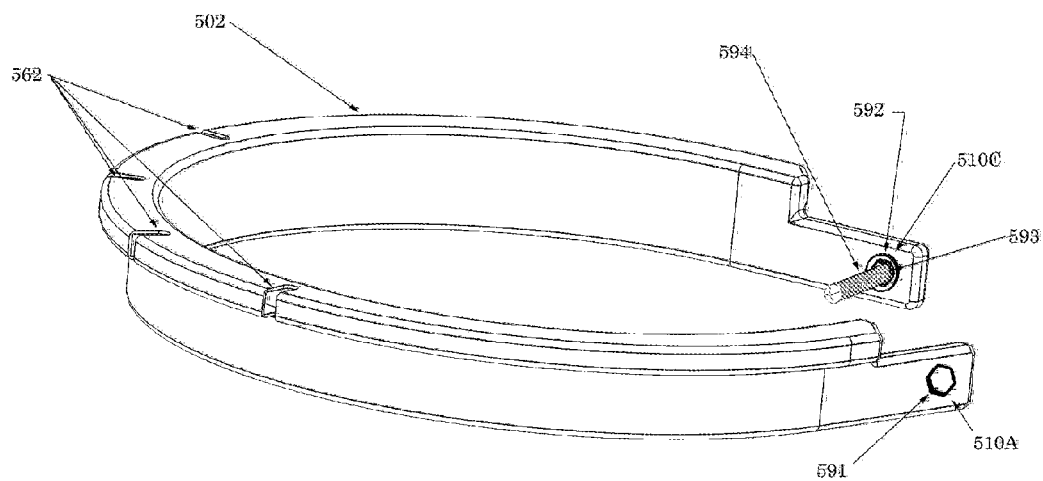
FIG. 5E is a perspective view of a strap with serrated latch pins.

Referring now to FIG. 5E, strap 502 has optional slots 562, and openings 570A and 570C. Serrated pin head 591 is shown through opening 570A of strap 502. Washer 592, nut 593, and serrated pin 594 are shown through opening 570C of strap 502.

Again referring to FIG. 5E, serrated pin 594 may be used instead of a bolt and lynch pin for attaching strap 502 to a tail. Instead, serrated pin 594 is pushed into a properly sized opening in the tail so that interference is created between the threads of serrated pin 594 and the tail.

Still referring to FIG. 5E, serrated pin 594 may be of any suitable size or shape but will typically have a spacing between threads (the serrated pins are not helical like those of a bolt or screw, rather they are circular and parallel to each other with a space between them) that is equal to or greater than the tail thickness. The tail may also be reinforced with a plate or other structure at the location the serrated pin is inserted which can also influence the spacing between threads of serrated pin 594. Serrated pin 594 may not need a washer or a nut to be attached to strap 502 and may be even simply pushed through strap 502 similar to how it is pushed into a hole in the tail. Serrated pin 594 may be attached to strap 502 by any suitable means including, but not limited to, chemical bonding, melting the materials together, clamping, or with interference. Serrated pin 594 may be of any suitable diameter, length or cross sectional shape. More than one serrated pin 594 may be used on a single strap end.

Still referring to FIG. 5E, serrated pin 594, washer 592, and nut 593 may be made of any suitable material including, but not limited to, metal, plastic, and fiberglass.

The above aspects of this invention may be mixed and matched in any manner suitable to achieve the purposes of this invention. It is recognized that while the bolt is shown on the tail (see, e.g., FIG. 5B), the bolt (or pin or other fastener) may be located on the strap (such as in FIG. 5E) instead of on the tail.

Figure 5F:
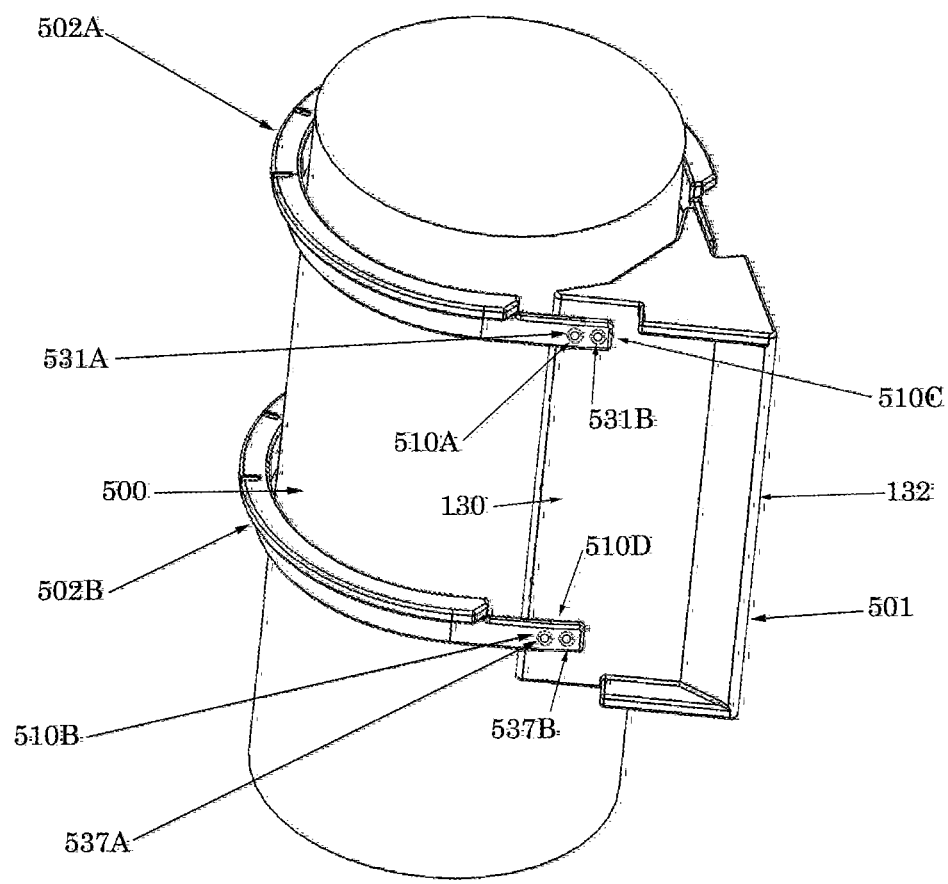
FIG. 5F is a perspective view of another embodiment of a tail and strap with an attachment mechanism.

Referring now to FIG. 5F, FIG. 5F presents fairing tail 501 secured by straps 502A and 502B around tubular 500, as shown in FIG. 5A. In this embodiment, however, strap 502A is attached to tail 501 using connection 510A as well as a second connection 510C while strap 502B is attached to tail 501 at connection 510B and a second connection 510D. In addition, connection 510A includes a first lynch pin 531A and connection 510C includes a second lynch pin 531B for attaching strap 502A to tail 501. Similarly, connection 510B includes a first lynch pin 537A and a second lynch pin 537B. It is contemplated that the use of two connections and two lynch pins to attach each end of straps 502A, 502B to tail 501 may provide additional reinforcement and/or stability to straps 502A, 502B. For example, the use of two connections per strap end reinforces the attachment between straps 502A, 502B and tail 501. In addition, the use of two connections per strap may prevent the strap from rotating about the connection point, and in turn, "sagging" around tubular 500. It should be understood that although laterally spaced connections 510A, 510C and 510B, 510D are shown, the connections could be spaced axially, or in other directions, so long as they improve strap stability as previously discussed.

Figure 5G:
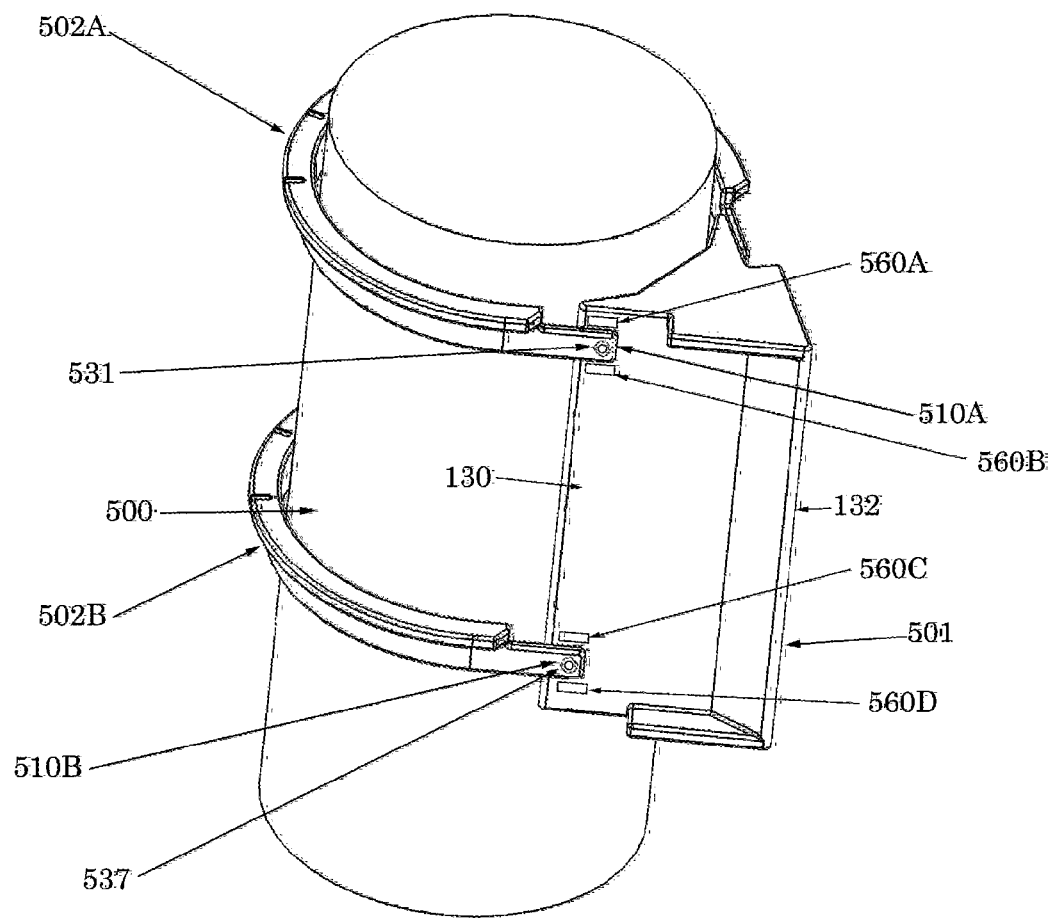
FIG. 5G is a perspective view of another embodiment of a tail and strap having a stabilizing member.

Referring now to FIG. 5G, FIG. 5G is similar to FIG. 5A in that it presents fairing tail 501 secured by straps 502A and 502B around tubular 500. In this embodiment, however, stabilizing members 560A, 560B, 560C and 560D are included on tail 501 to help maintain the position of straps 502A, 502B with respect to tail 501 at the connections 510A, 510B. In this aspect, stabilizing members 560A-560D may be structures which protrude from the tail surface, at locations above and/or below each of straps 502A, 502B. For example, stabilizing members 560A-560D may be ledge or shelf like structures that are either attached to tail 501, or integrally formed with tail 501 during manufacture. Representatively, stabilizing member 560A and stabilizing member 560B may be shelf like structures that protrude from the surface of tail 501, and are spaced from one another in an axial direction a sufficient distance to accommodate insertion of the end of strap 502A. Similarly, stabilizing member 560C and stabilizing member 560D may be shelf like structures that protrude from the surface of tail 501, and are spaced from one another in an axial direction a sufficient distance to accommodate insertion of the end of strap 502B. Since stabilizing members 560A-560D are positioned above and below their respective straps 502A, 502B, straps 502A, 502B are prevented from moving, or otherwise rotating, at connections 510A, 510B, thereby preventing sagging as previously discussed. It should be understood that although each strap end is shown positioned between two of stabilizing members 560A-560D, a single stabilizing member either above or below each of straps 502A, 502B may be used to help maintain the strap position along tail 501. In addition, stabilizing members 560A-560D may be of any size and shape so long as they protrude far enough from the surface of tail 501 to prevent straps 502A, 502B from sliding over stabilizing members 560A-560D.

In the broadest embodiment, the present invention is directed to systems and methods for constructing a fairing body having multiple pieces; methods and systems for constructing a tail fairing with one or more slots; and systems and methods for quickly attaching a tail fairing to a tubular, for example, a strap which can be quickly attached to a fairing tail.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. For several of the ideas presented herein, one or more of the parts may be optional. The invention should therefore not be limited by the above described embodiment, method, and examples, but by all embodiments and methods within the scope and spirit of the invention.

What is claimed is:

1. A fairing for suppressing a vortex induced vibration (VIV) of a tubular, the fairing comprising:
   a tail member dimensioned to suppress a vortex induced vibration of a tubular;
   an encircling member dimensioned to encircle less than an entire circumference of a tubular, the encircling member being separable from the tail member; and
   a connecting assembly dimensioned to attach the tail member to the encircling member, the connecting assembly comprising an insertion member extending from an inner surface of the encircling member in a direction substantially perpendicular to the inner surface, and a channel formed within an outer surface of the tail member, and wherein the insertion member is dimensioned to be inserted into the channel.

2. The fairing of claim 1 wherein the tail member comprises a base portion and a fin portion, wherein the channel is formed within the base portion and the base portion is dimensioned to partially encircle a tubular and the fin portion extends from the base portion in a direction normal to the tubular.

3. The fairing of claim 1 wherein the tail member encircles less than an entire circumference of a tubular when positioned on the tubular.

4. The fairing of claim 1 wherein the encircling member has a height that is equal to, or less than, a height of the tail member.

5. The fairing of claim 1 wherein the encircling member comprises a first end and a second end, wherein each of the first end and the second end are connected to the tail member by the connecting assembly.

6. The fairing of claim 5 wherein the insertion member of the connecting assembly comprises a first bolt and a second bolt, wherein the first bolt is inserted through the first end and the tail member and the second bolt is inserted through the second end and the tail member.

7. The fairing of claim 1 wherein the channel is formed through a side of the tail member facing away from a tubular around which the tail member is positioned.

8. The fairing of claim 1 wherein the tail member comprises a first set of tabs and the encircling member comprises a second set of tabs, and wherein the channel is formed within each of the first set of tabs, and wherein the insertion member is formed within each of the second set of tabs.

9. The fairing of claim 1 wherein the tail member comprises a first set of tabs and the encircling member comprises a second set of tabs, and wherein each of the first set of tabs comprises a hole and each of the second set of tabs comprises a slot, and wherein the tail member is connected to the encircling member by aligning the slot with the hole and inserting the insertion member therethrough.

10. The fairing of claim 1 wherein the connecting assembly further comprises a lynch pin extending through an opening in the insertion member.

11. The fairing of claim 10 wherein the tail member comprises a stabilizing member formed on an outer surface of the tail member facing the encircling member, wherein the stabilizing member is positioned on the outer surface such that it is above or below the encircling member when the insertion member is inserted through the opening in the encircling member.

12. The fairing of claim 1 wherein the encircling member is a strap that attaches the encircling member to the tail member via the connecting assembly.

13. A fairing for suppressing a vortex induced vibration (VIV) of a tubular, the fairing comprising:
   a tail member dimensioned to suppress a vortex induced vibration of a tubular, the tail member having a base portion that encircles less than an entire circumference of a tubular and a fin portion that extends from the base portion, and wherein a slot is formed within the base portion; and
   an encircling member dimensioned to encircle less than an entire circumference of a tubular, the encircling member having a first end and a second end, and wherein an insertion member extends from at least one of the first end or the second end, and includes a fairing block, wherein the fairing block of the insertion member is dimensioned to be inserted into the slot formed within the base portion to connect the encircling member to the tail member.

14. The fairing of claim 13 wherein the tail member and the encircling member are formed as two different separable structures.

15. The fairing of claim 13 wherein the base portion of the tail member is hollow.

16. The fairing of claim 13 wherein the tail member comprises a tail member tab that aligns with an encircling member tab on one of the first end or the second end of the encircling member, and the insertion member extends from the tail member tab and the slot is formed within the encircling member tab.

17. A fairing for suppressing a vortex induced vibration (VIV) of a tubular, the fairing comprising:
   a tail member dimensioned to suppress a vortex induced vibration of a tubular, the tail member having a base portion that encircles less than an entire circumference of a tubular and a fin portion that extends from the base portion, and wherein an insertion member extends from the base portion and a stabilizing member is formed on an outer surface of the tail member facing the encircling member such that the stabilizing member is above or below the encircling member when the insertion member is inserted through the opening in the encircling member; and
   an encircling member dimensioned to encircle less than an entire circumference of a tubular, the encircling member having a first end and a second end, and wherein an insertion member opening dimensioned to receive the insertion member is formed within one of the first end or the second end of the encircling member.

18. The fairing of claim 17, wherein the insertion member comprises a pin opening, wherein the pin opening is dimensioned to receive a pin, and the pin is operable to prevent the insertion member from sliding out of the insertion member opening.

19. A fairing for suppressing a vortex induced vibration (VIV) of a tubular, the fairing comprising:
- a tail member dimensioned to suppress a vortex induced vibration of a tubular;
- an encircling member dimensioned to encircle less than an entire circumference of a tubular, the encircling member being separable from the tail member; and
- a connecting assembly dimensioned to attach the tail member to the encircling member, wherein the connecting assembly comprises an insertion member extending from a surface of the tail member facing away from the tubular, wherein the insertion member is dimensioned for insertion through an opening formed through an end of the encircling member, and wherein the opening is capable of receiving a lynch pin once the insertion member is inserted through the opening.

* * * * *